(12) United States Patent
Perez-Sanchez

(10) Patent No.: US 7,108,231 B2
(45) Date of Patent: Sep. 19, 2006

(54) ADJUSTMENT MECHANISM FOR A VARIABLE-SHAPE WING

(75) Inventor: Juan Perez-Sanchez, Feldkirchen-Westerham (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/823,716

(22) Filed: Apr. 14, 2004

(65) Prior Publication Data

US 2005/0103945 A1 May 19, 2005

(30) Foreign Application Priority Data

Apr. 14, 2003 (DE) ............................... 103 17 258

(51) Int. Cl.
*B64C 13/36* (2006.01)
(52) U.S. Cl. ..................................... 244/219; 244/99.5
(58) Field of Classification Search ................ 244/219, 244/218, 226, 123, 124, 78, 75 R, 49.5; 92/92, 92/48
See application file for complete search history.

(56) References Cited

U.S. PATENT DOCUMENTS

| | | | |
|---|---|---|---|
| 2,369,006 A | | 2/1945 | Banks |
| 3,047,257 A | * | 7/1962 | Chester ...................... 244/226 |
| 3,172,621 A | | 3/1965 | Erwin |
| 3,229,590 A | * | 1/1966 | Huska ........................... 92/48 |
| 3,785,567 A | * | 1/1974 | Fisher .................. 239/265.39 |
| 4,349,169 A | | 9/1982 | McAnally |
| 5,839,700 A | | 11/1998 | Nedderman, Jr. |
| 6,015,115 A | * | 1/2000 | Dorsett et al. .............. 244/123 |
| 6,164,599 A | | 12/2000 | Piening et al. |
| 6,227,498 B1 | * | 5/2001 | Arata ......................... 244/219 |
| 6,347,769 B1 | * | 2/2002 | To et al. ..................... 244/219 |
| 6,437,769 B1 | | 2/2002 | To et al. |
| 6,487,959 B1 | * | 12/2002 | Perez et al. .................... 92/92 |

FOREIGN PATENT DOCUMENTS

| | | |
|---|---|---|
| DE | 680525 | 8/1939 |
| DE | 10009157 | 9/2001 |
| DE | 10202440 | 10/2003 |
| EP | 0860355 | 8/2003 |

\* cited by examiner

*Primary Examiner*—Galen Barefoot
(74) *Attorney, Agent, or Firm*—Greenblum & Bernstein, P.L.C.

(57) ABSTRACT

Adjustment mechanism for adjustment area of variable-shape flow surface with two opposite skin surfaces includes plurality of whirl chambers swivelably arranged next to one another so that the whirl chambers are swivelable relative to one another, and the whirl chambers include lateral stiffening elements and longitudinal stiffening elements. Joints are structured and arranged to jointedly couple lateral stiffening elements and longitudinal stiffening elements of the whirl chambers, and a first drive tube section and a second drive tube section are arranged between adjacent longitudinal stiffening elements. A pump is coupled to first and second drive tube sections and control device is functionally connected to pump to swivel adjacent whirl chambers around joint axes via complementary volume changes in first and second drive tube sections. The instant abstract is neither intended to define the invention disclosed in this specification nor intended to limit the scope of the invention in any way.

28 Claims, 26 Drawing Sheets

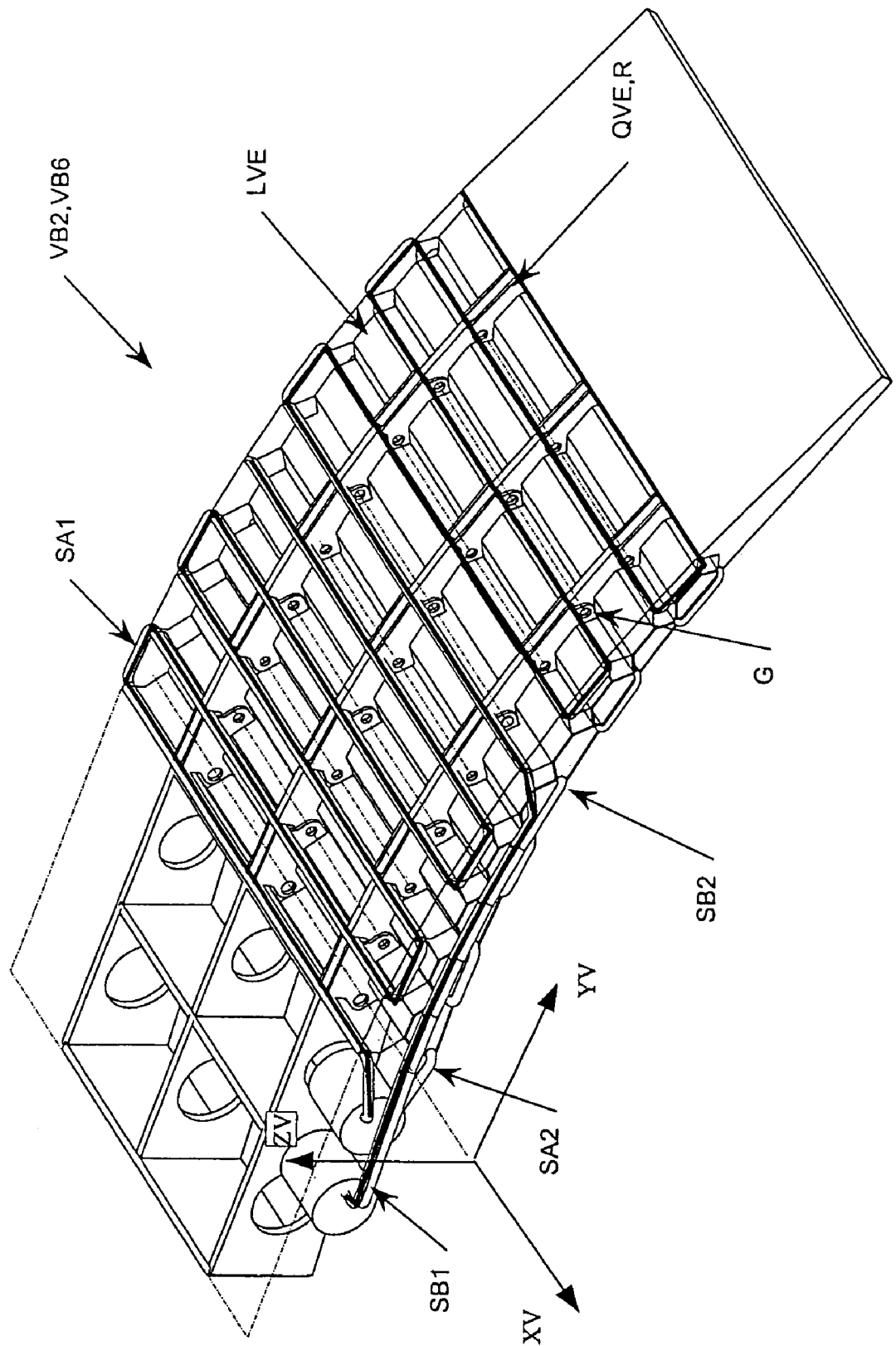

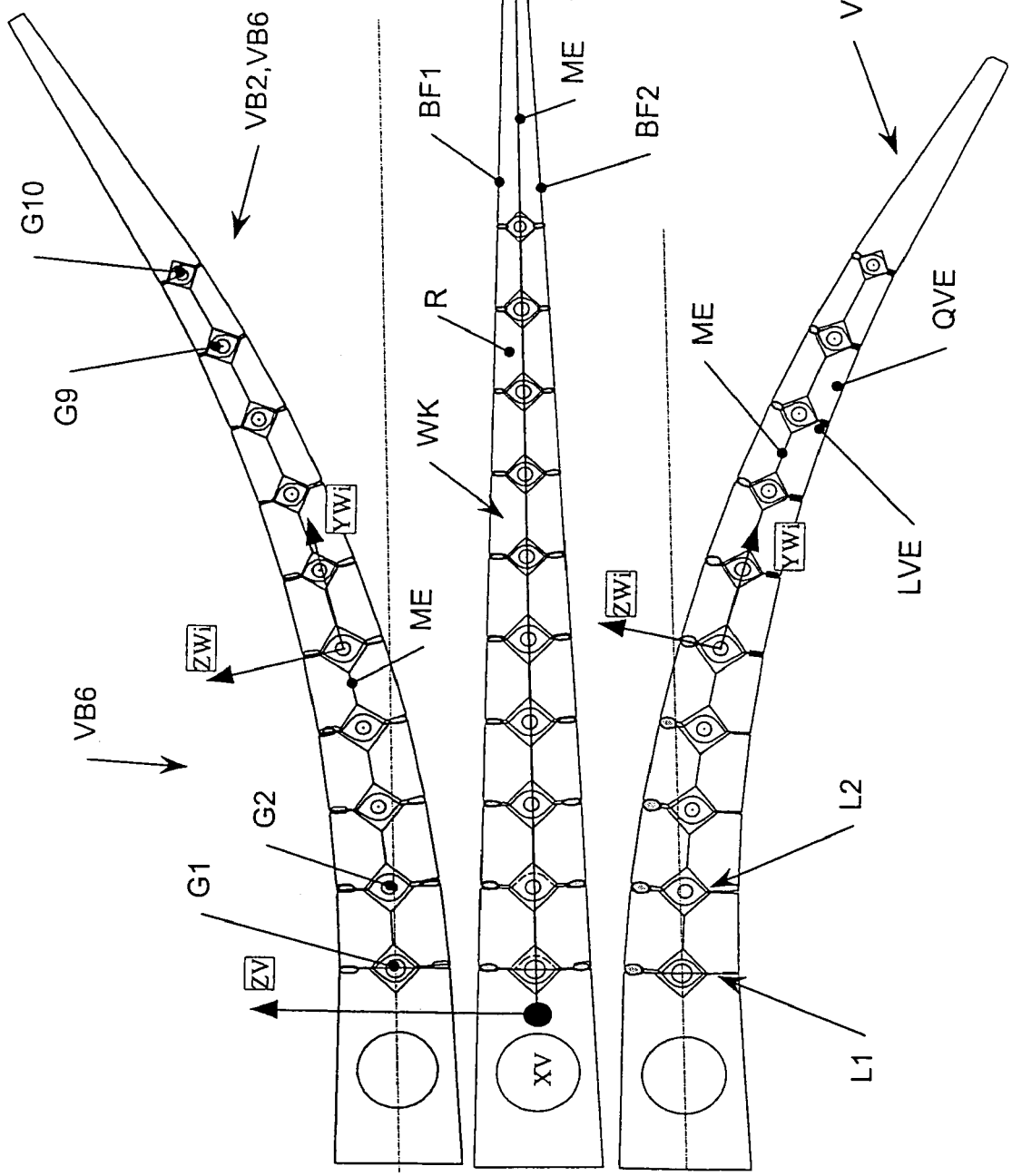

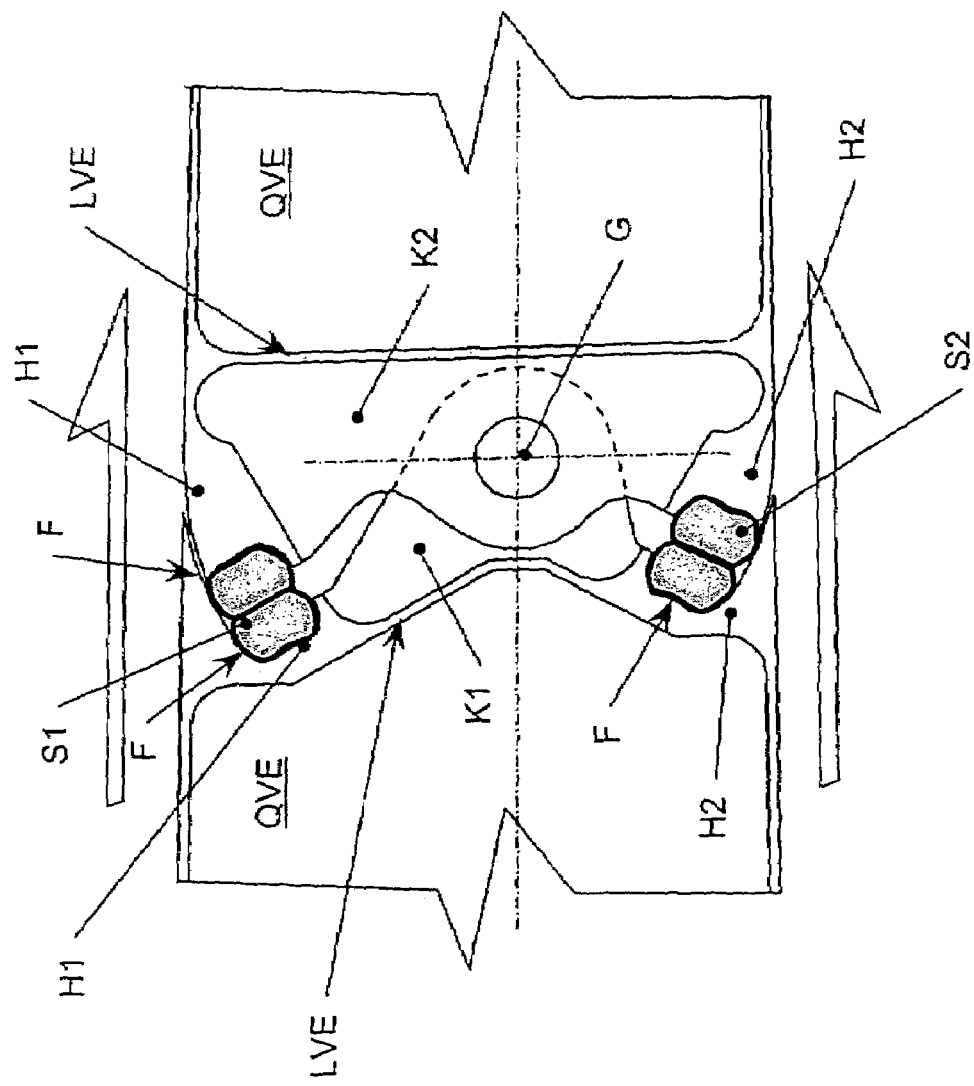

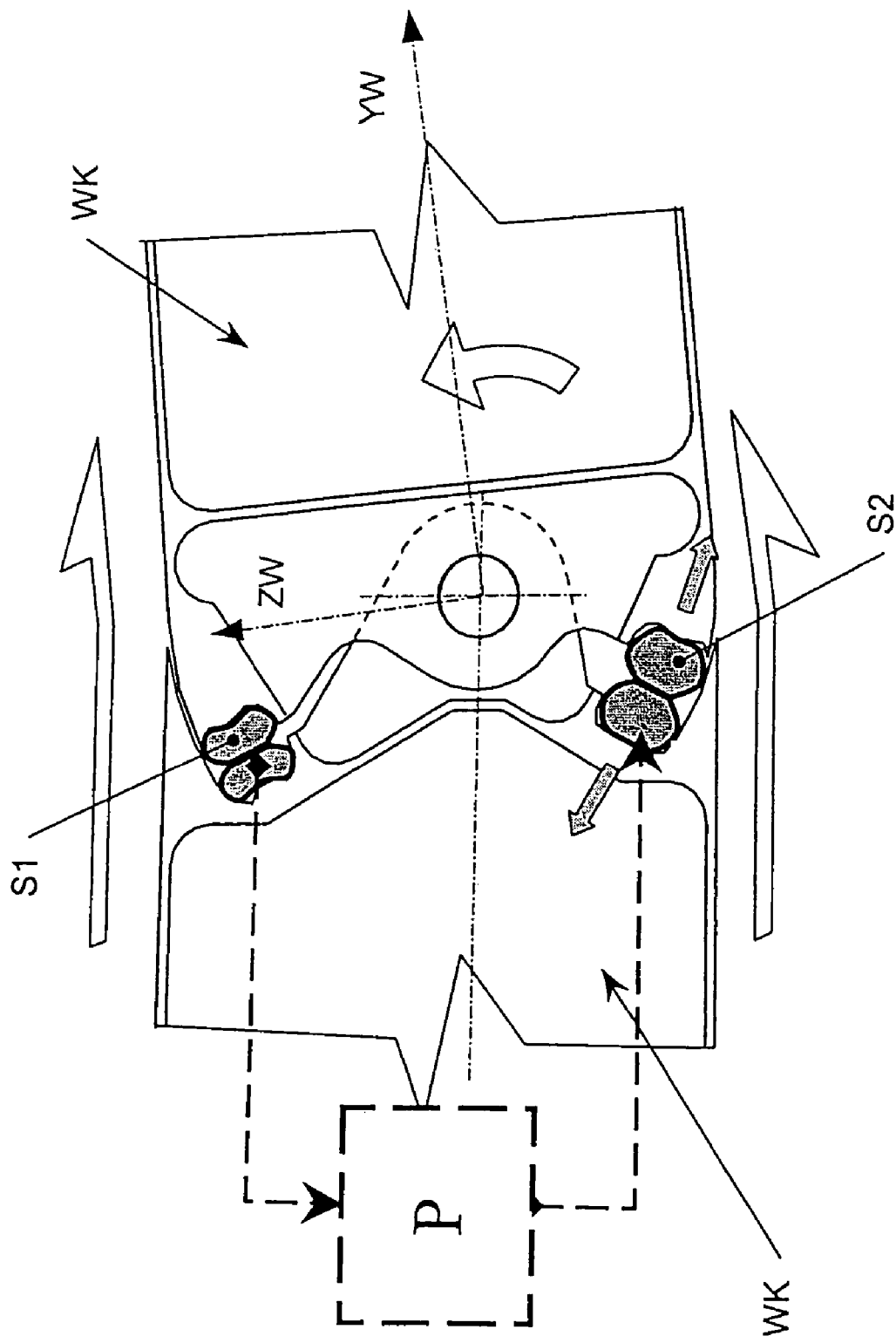

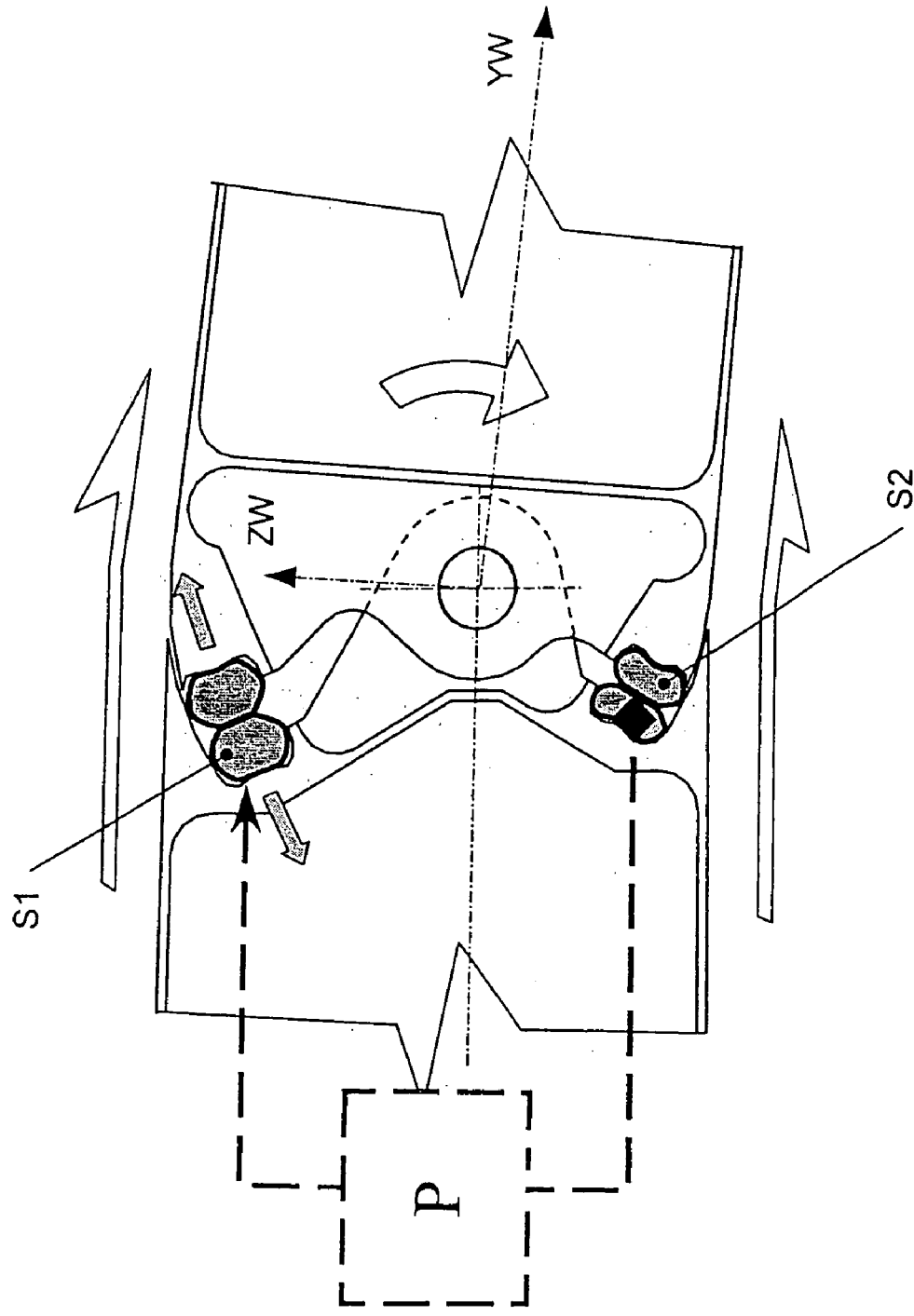

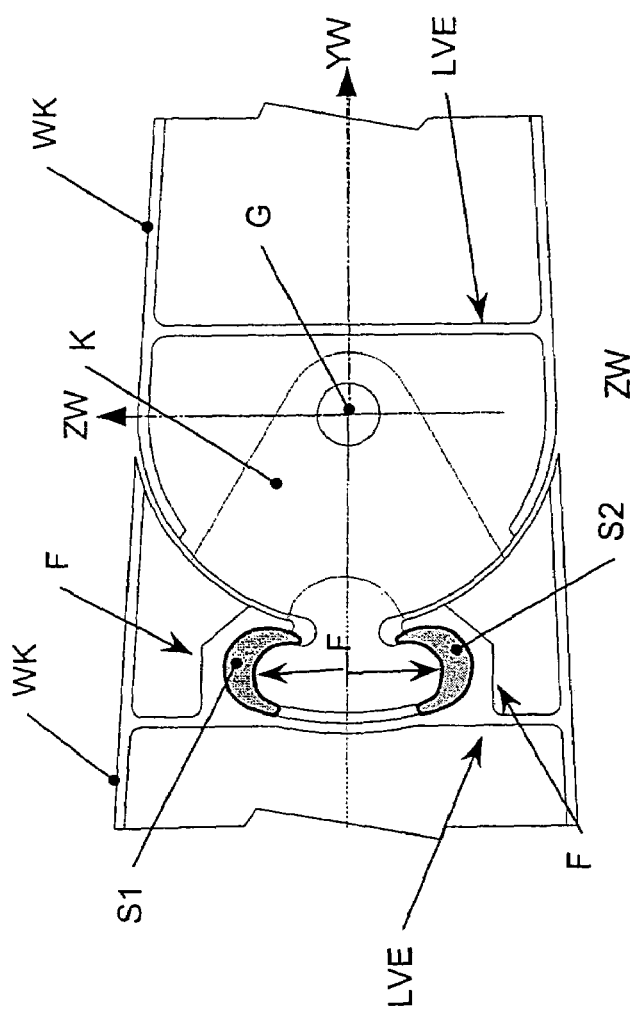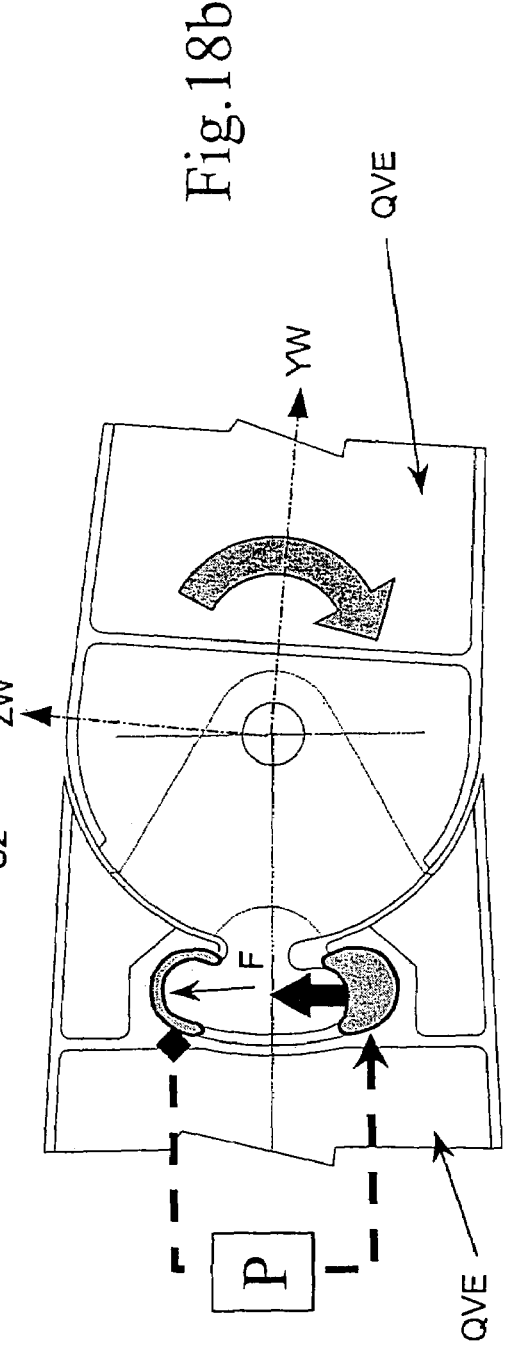

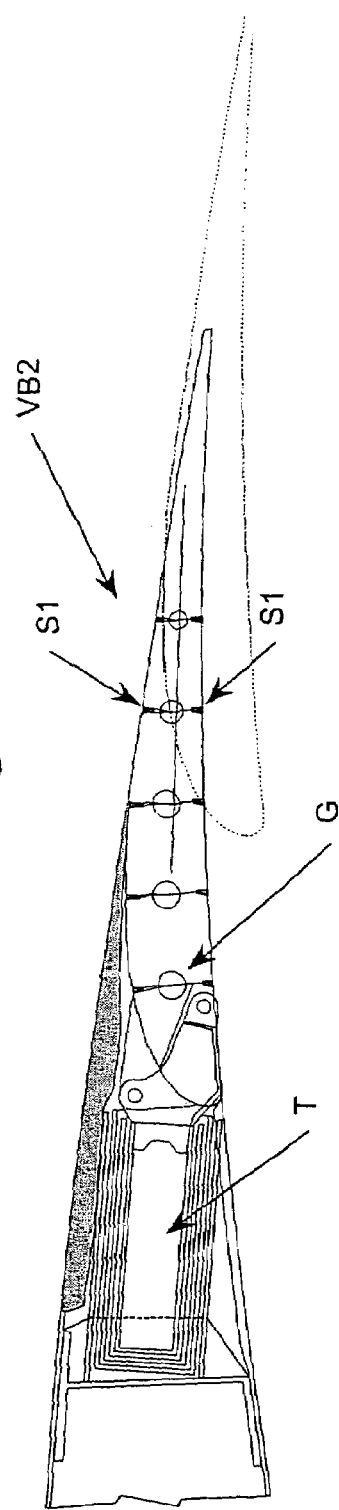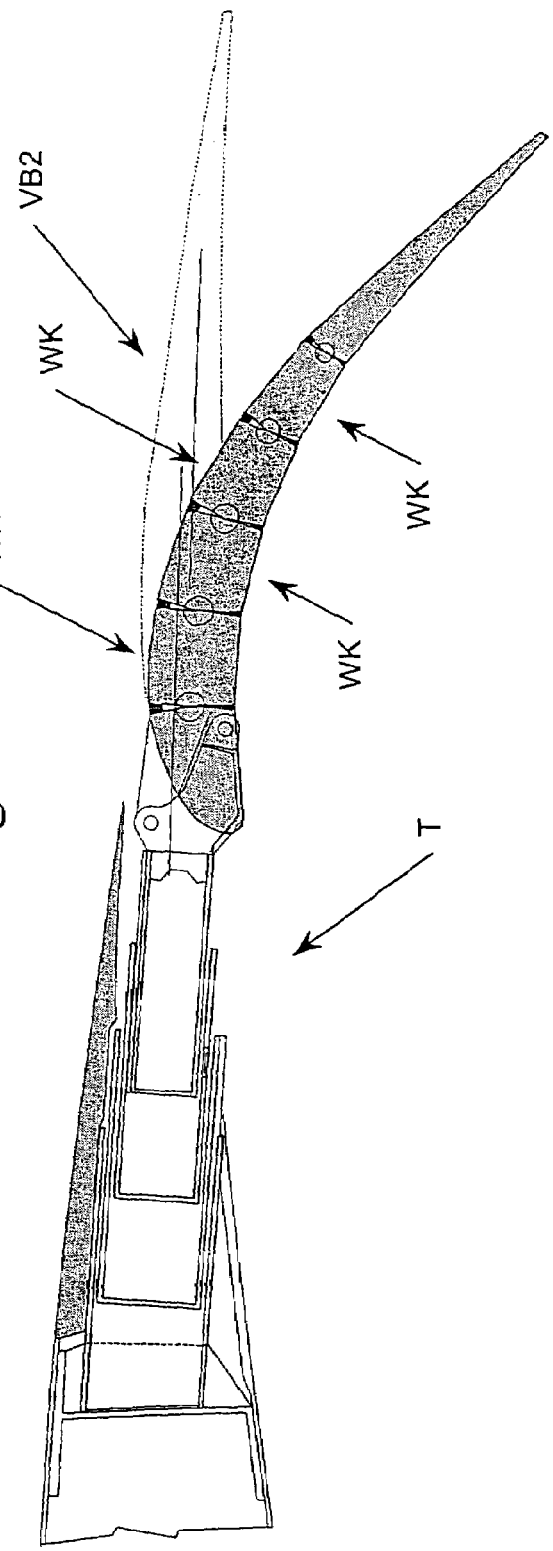

ADJUSTMENT MECHANISM FOR A VARIABLE-SHAPE WING

CROSS-REFERENCE TO RELATED APPLICATIONS

The present application claims priority under 35 U.S.C. §119 of German Patent Application No. 103 17 258.0, filed on Apr. 14, 2003, the disclosure of which is expressly incorporated by reference herein in its entirety.

BACKGROUND OF THE INVENTION

1. Field of the Invention

The invention relates to an adjustment mechanism for a variable-shape wing.

The wing can be in general a part of a flow surface or can form it essentially or completely. The flow surface can be used in particular for an aircraft and can be, e.g., a wing, an empennage or a front face or a canard.

2. Discussion of Background Information

Adjustment mechanisms for adjusting the curvature of a wing are known from U.S. Pat. No. 4,349,169, DE 680 525 and EP 860 355; however, their actuator system is complex and therefore unreliable and unfavorably designed with respect to weight. A further disadvantage of the prior art is that hydraulic cylinders are used that are supported on the primary structure in a jointed manner. The driven flaps must therefore feature a relatively high stiffness so that they are heavier than would be necessary based on the acting flight loads. Another disadvantage resulting from this approach is that the loads are introduced only on locally very limited points in the structure. A relatively great material accumulation is thus necessary, which in turn leads to an increase in weight.

Through the distortion of the air flow due to a flap movement with rigid flaps according to the prior art, local accelerations of the air and pressure waves can occur that cause an additional air resistance. In turn greater loads can consequently result on the flap, and longitudinal stability problems can occur, in particular with stabilized aircraft.

SUMMARY OF THE INVENTION

The present invention provides an alternative adjustment mechanism for a variable-shape wing.

According to the invention, the adjustment mechanism includes a plurality of whirl chambers swivelably arranged next to one another so that the whirl chambers are swivelable relative to one another. The whirl chambers include lateral stiffening elements and longitudinal stiffening elements, and joints are structured and arranged to jointedly couple the lateral stiffening elements and the longitudinal stiffening elements of the whirl chambers. A first drive tube section and a second drive tube section are arranged between adjacent longitudinal stiffening elements. A pump is coupled to the first and second drive tube sections and a control device is functionally connected to the pump to swivel adjacent whirl chambers around joint axes via complementary volume changes in the first and second drive tube sections.

According to the invention, an adjustment mechanism is provided for an adjustment area of a variable-shape flow surface with two opposite skin surfaces, with several whirl chambers that are arranged next to one another and can be swiveled with respect to one another with lateral stiffening elements and longitudinal stiffening elements that are connected to one another by a joint in a jointed manner, so that the whirl chambers can be swiveled relative to one another, whereby respectively a first drive tube section and a second drive tube section is arranged between respectively adjacent longitudinal stiffening elements, which drive tube sections are respectively connected to a pump to provide a predetermined volume via a pressure medium, so that the axis of the joint runs between the drive tube sections, and whereby the pump is functionally connected to a control device in order to swivel adjacent whirl chambers around the joint axis by complementary volume changes in the first and second drive tube section on the basis of control instructions.

The drive tube sections can be connected to one another such that several first and/or second drive tube sections are formed from a continuous drive tube. Several drive tube sections connected to one another can be respectively connected to one another and can be supplied by one pump. Individual drive tube sections can be pressurized in a targeted manner with individual pumps so that the curvature of the adjustment area can also be adjusted as a function of control commands to be passed on to the respective pumps. The lateral stiffening elements can have the function of ribs of the adjustment area and the longitudinal stiffening elements can have the function of spars, and vice versa.

The drive tube sections can extend over a group of several whirl chambers arranged one behind the other in the whirl chamber longitudinal direction, whereby the volumes for the drive tube of each group of whirl chambers can be adjusted separately.

In addition to a line of whirl chambers, further whirl chambers can be arranged which are mechanically coupled thereto and for which a further pump is installed in order to separately adjust the volumes in the drive tube sections for this further group of whirl chambers.

Groups of whirl chambers arranged one behind the other in the whirl chamber lateral direction can be supplied by respectively an individual pump. Drive tube sections that between groups of whirl chambers connected to one another in a jointed manner in the whirl chamber lateral direction can form several drive systems with respectively one first drive tube and respectively one second drive tube and with respectively one pump, whereby the drive tubes respectively feature several drive tube sections according to the invention for adjusting two adjacent whirl chambers relative to one another.

Several drive tube sections can also be arranged between respectively two adjacent longitudinal stiffening elements.

Through the concept according to the invention of a line of whirl chambers driven by drive tube sections, a high redundancy can be achieved in the drive chain for the respective adjustment area and thus a high security against breakdowns can be achieved, since the components used can be installed in a parallel manner without any substantial increase in equipment-related expenditure.

The solution according to the invention results in an adjustment area, the adjustment conditions of which produce a relatively favorable resistance and improved aerodynamic effectiveness. Moreover, a reduction in noise can be achieved.

To realize the adjustment mechanism according to the invention, relatively parts are necessary so that a great reliability can be achieved. Moreover, a relatively small space is required. The relatively low number of components and the favorable load introduction and load distribution result in a relatively low weight for the adjustment mechanism.

It is also advantageous in the solution according to the invention that the whirl chambers can be arranged independent of the skin curvature of the adjustment area, so that the adjustment mechanism according to the invention can be used in a variety of ways.

The present invention is directed to an adjustment mechanism for an adjustment area of a variable-shape flow surface with two opposite skin surfaces. The adjustment mechanism includes a plurality of whirl chambers swivelably arranged next to one another so that the whirl chambers are swivelable relative to one another, and the whirl chambers include lateral stiffening elements and longitudinal stiffening elements. Joints are structured and arranged to jointedly couple the lateral stiffening elements and the longitudinal stiffening elements of the whirl chambers, and a first drive tube section and a second drive tube section are arranged between adjacent longitudinal stiffening elements. A pump is coupled to the first and second drive tube sections and a control device is functionally connected to the pump to swivel adjacent whirl chambers around joint axes via complementary volume changes in the first and second drive tube sections.

In accordance with a feature of the invention, the pump can provide a predetermined volume in the first and second drive tube sections via a pressure medium.

According to another feature of the instant invention, the joint axes may run between the first and second drive tube sections.

Further, the pump can provide the complementary volume changes through circulation or volume transfer of the pressure medium. The control device may be structured and arranged to control operation of the pump.

The first and second drive tube sections may be connected to one another. Still further, several tube sections composed of at least first and second drive tube sections can be formed from a continuous drive tube.

Moreover, several drive tube sections can be connected to one another and supplied by the pump.

Individual drive tube sections may be pressurizable in a targeted manner with individual pumps so that the curvature of an adjustment area is adjustable as a function of commands from the control device to the pump.

The lateral stiffening elements can function as ribs of an adjustment area and the longitudinal stiffening elements can function as spars.

Alternatively, the lateral stiffening elements may function as spars of an adjustment area and the longitudinal stiffening elements may function as ribs.

The first and second drive tube sections can extend over a group of several whirl chambers arranged one behind the other in a whirl chamber longitudinal direction. Volumes for the first and second drive tubes of each group of whirl chambers can be separately adjustable.

The adjustment mechanism can further include additional whirl chambers that are mechanically coupled the plurality of whirl chambers. The first and second drive tube sections can be arranged between adjacent ones of the additional whirl chambers. A further pump can be provided to separately adjust pressures in the first and second drive tube sections associated with the additional whirl chambers. The plurality of whirl chambers and the further whirl chambers may be arranged one behind the other in a whirl chamber lateral direction and may be supplied by an individual pump.

Several drive systems can be formed by the drive tube sections positioned between groups of whirl chambers that are jointedly connected to one another in a whirl chamber lateral direction, and the drive systems may include one first drive tube, one second drive tube, and one pump. Several drive tube sections can be positioned to adjust two adjacent whirl chambers relative to one another.

Several drive tube sections may be arranged between two adjacent longitudinal stiffening elements.

The joint can include two force transmission elements with levers structured and arranged to form a lever arm with reference to a joint axis. The levers can have bearing faces arranged to face each other and to accept at least one tube section in order to impart opposite forces on the bearing faces. Further, the contact surfaces can be positioned with respect to the joint axis such that, when a compressive force is exerted on the respective opposite contact surfaces, a force component results in the whirl chamber lateral direction that with two levers per fork is at least half of the compressive force exerted by the respective drive tube section.

One force transmission element may be arranged between two whirl chambers, and an effective lever arm of the two whirl chambers can run at an acute angle to the whirl chamber lateral direction on which the moment is to be exerted and the contact surfaces to accept the at least one drive tube section are positioned with respect to the joint axis. In this manner, when a compressive force is exerted on opposing contact surfaces, a force component develops in a whirl chamber depth direction that with two pairs of contact surfaces per force transmission element is at least half of the compressive force exerted by the drive tube section.

The joint may include as a structural joint. The structural joint can include two links that are reciprocally attached to the respective longitudinal stiffening elements of adjacent whirl chambers, the courses of which intersect in the joint axis in the whirl chamber longitudinal direction. The longitudinal stiffening elements of adjacent whirl chambers may be supported on bearing elements that are positioned next to the links relative to the whirl chamber longitudinal direction.

In accordance with still yet another feature of the present invention, the flow surface can be the wing of an aircraft.

The present invention is directed to a process for adjusting for an adjustment area of a variable-shape flow surface with two opposite skin surfaces. The process includes swivelably positioning a plurality of whirl chambers next to one another so that the whirl chambers are swivelable relative to one another and controlling the swiveling of the plurality of whirl chambers by changing a complementary volume of first and second drive tube sections positioned between adjacent longitudinal stiffening elements of the whirl chambers.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

According to the invention, an adjustment mechanism is provided for a variable-shape wing area that in general is a part of a flow surface or forms this essentially or completely. The flow surface can be used in particular for an aircraft and can be, e.g., a wing, an empennage or a front face or canard.

Figure 1:
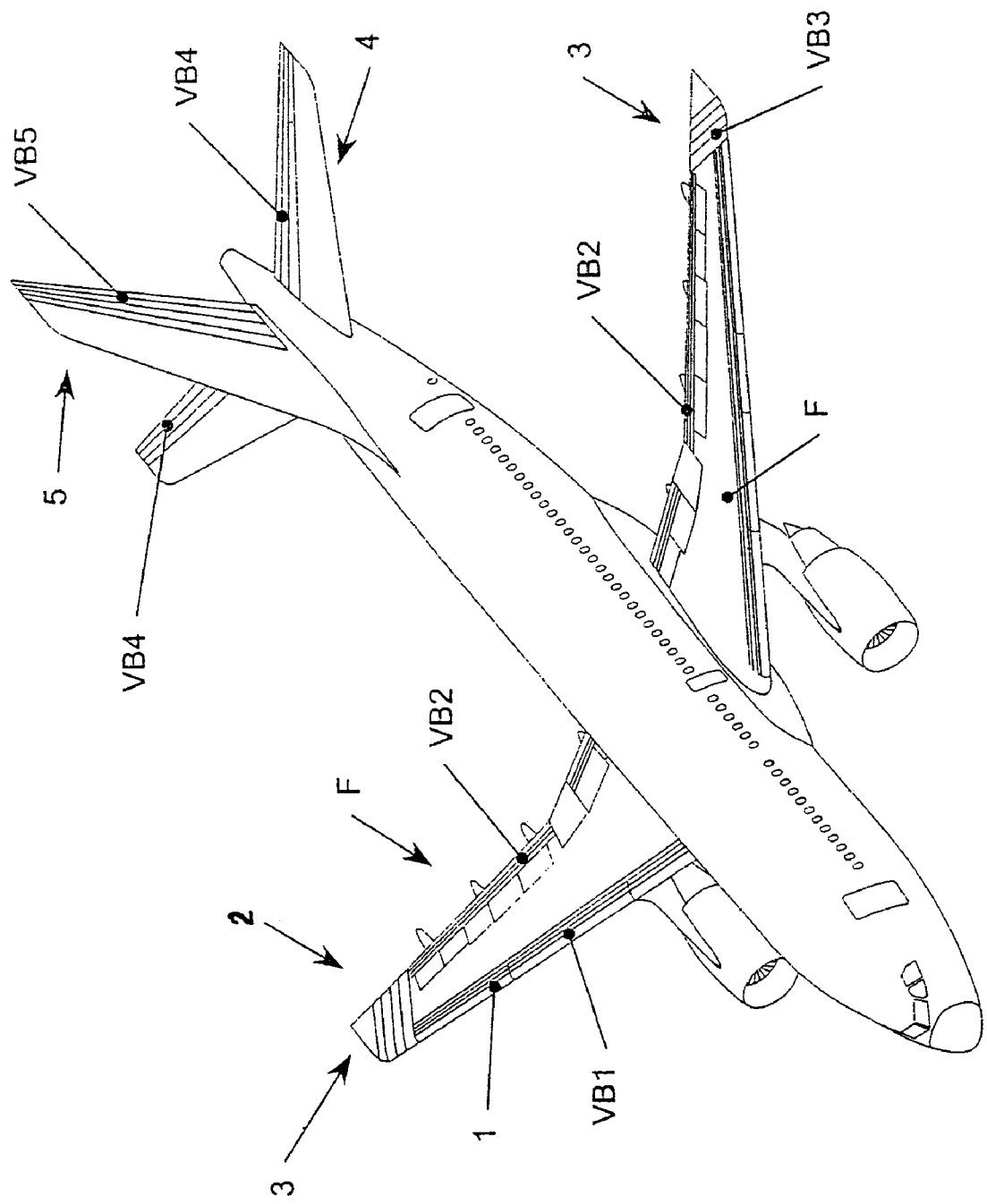
FIG. 1 a commercial aircraft that as an illustrative example features respectively an adjustment area with the adjustment mechanism according to the invention on the leading edge wing, the trailing edge wing, the outer wing area on the wing tip, the elevator assembly and the rudder assembly.

Examples for the possible uses of the adjustment mechanism according to the invention for a variable-shape wing area or adjustment area VB are given in FIG. 1 on the basis of the commercial aircraft shown there. In this representation the leading edge wing 1, the trailing edge wing 2, the outer wing area on the wing tip 3, the elevator assembly 4 and the rudder assembly 5 respectively feature an adjustment area VB1, VB2, VB3, VB4 or VB5 with an adjustment mechanism according to the invention. The adjustment area can form these flow surfaces partially, completely or essentially.

Figure 2:
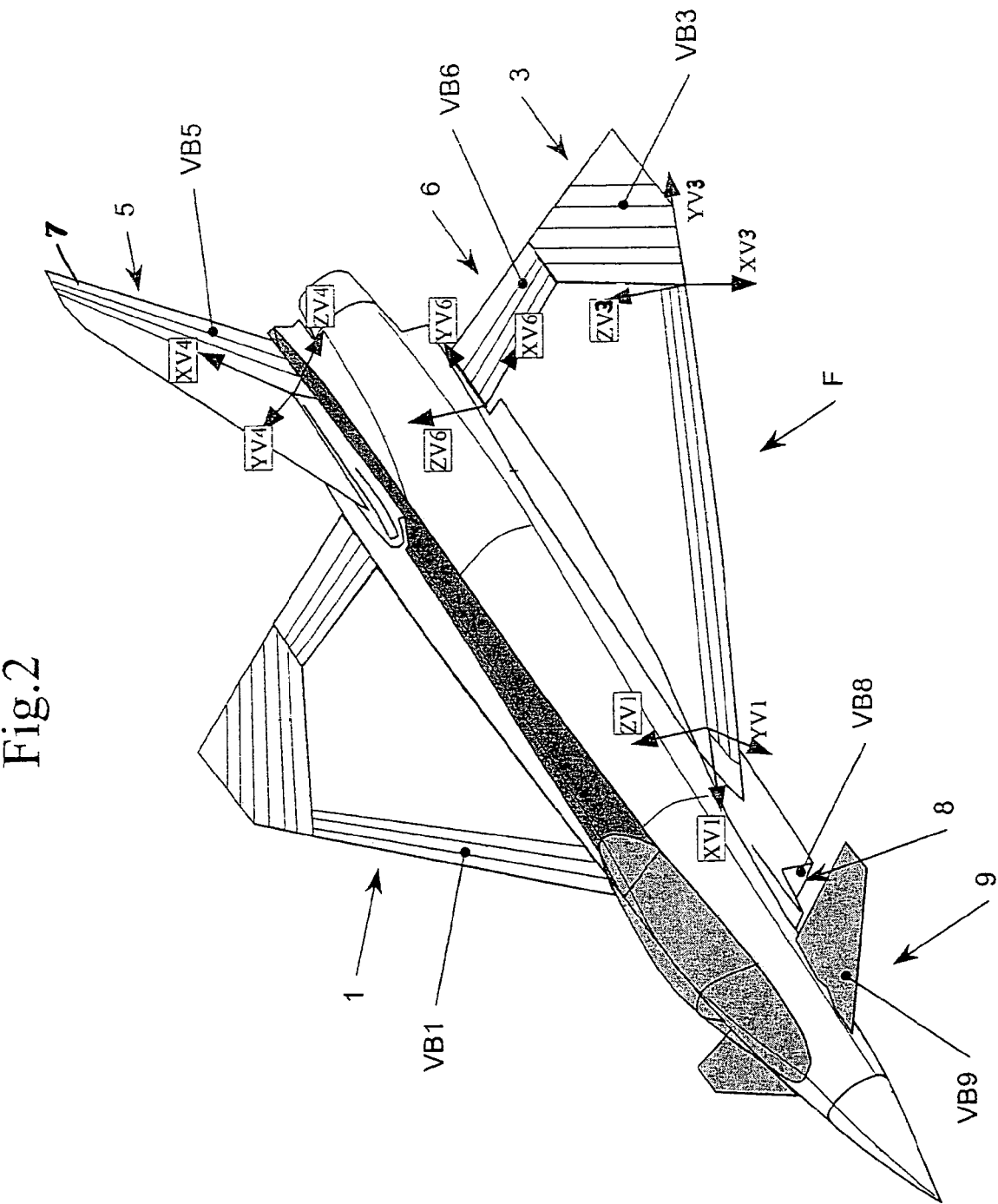
FIG. 2 a military aircraft on which respectively an adjustment area with the adjustment mechanism according to the invention is arranged, e.g., on the leading edge wing, the trailing edge wing, the outer wing area on the wing tip, the elevator assembly, the rudder assembly and the intake lip.

Further examples for the arrangement of an adjustment area VB with the adjustment mechanism according to the invention are shown in FIG. 2 on the basis of the military aircraft shown there, whereby in addition to the slat or the leading edge wing 1, the rudder assembly 5 and the wing tip area 3, the aileron 6, the rudder 7, the intake lip 8 on the air intake and the canard 9 feature an adjustment area VB6, VB7, VB8 or VB9 or are formed from an adjustment area that can be adjusted by the adjustment mechanism according to the invention.

The adjustment area according to the invention can also be arranged only on individual specified points on the aircraft or on other points of the same, e.g., on the spoilers. Instead of a wing section, also the whole wing F can be formed according to the invention.

Figure 3:
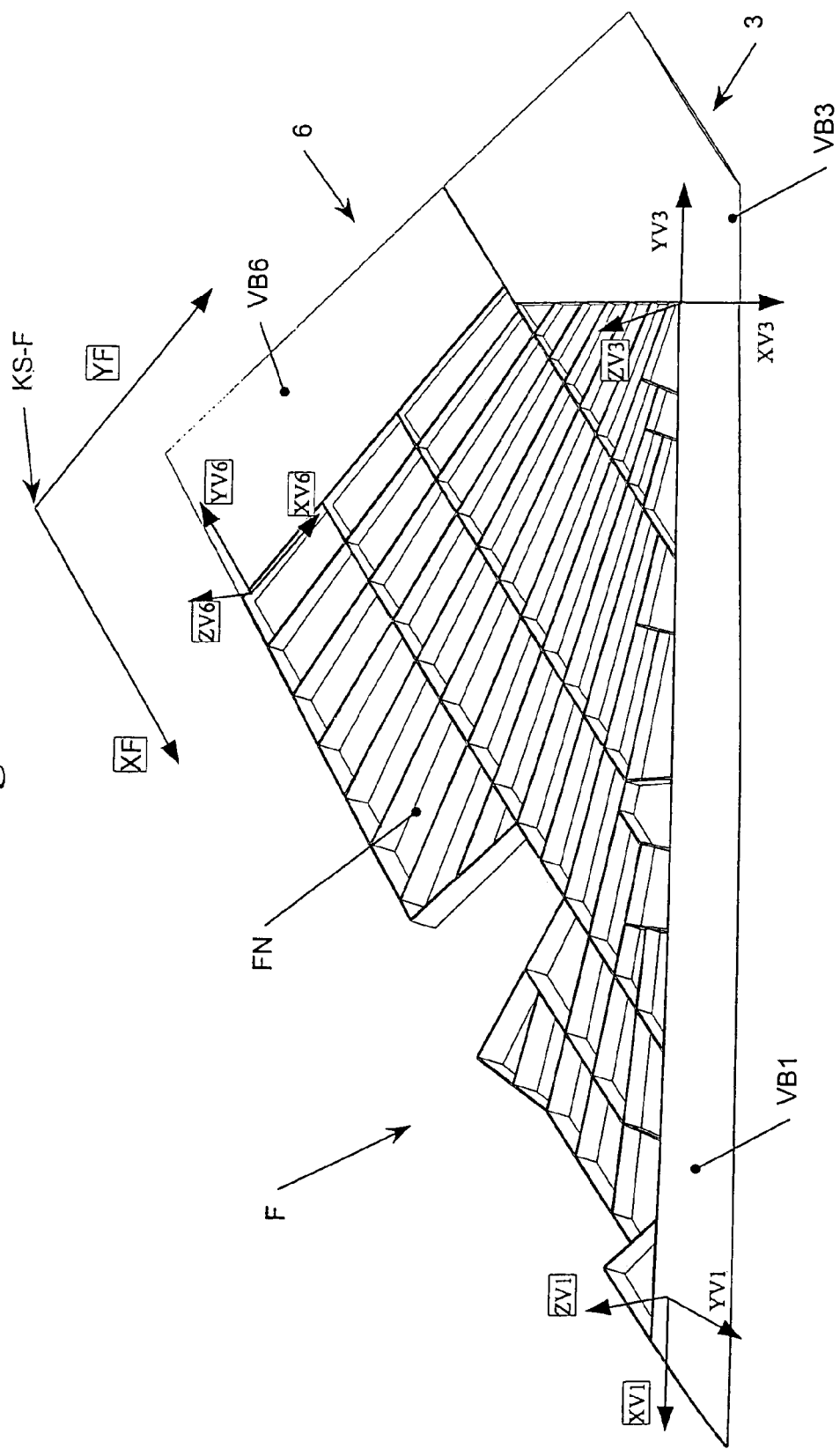
FIG. 3 the wing of the aircraft shown in FIG. 2 as such, whereby the wing area that is not adjustable in the example shown is shown in section, i.e., without skin, and the adjustment areas according to the invention are shown as closed or skinned parts.

FIG. 3 shows the wing F of the aircraft shown in FIG. 2 as such, whereby the wing area FN, which cannot be adjusted in the example shown, is shown in section, i.e., without skin, and the adjustment areas VB1, VB3, VB6 according to the invention are shown as closed or skinned parts. In FIG. 3 the commonly used wing coordinate system KS-F is marked which contains the wing span direction XF and the wing longitudinal direction YF.

Figure 4:
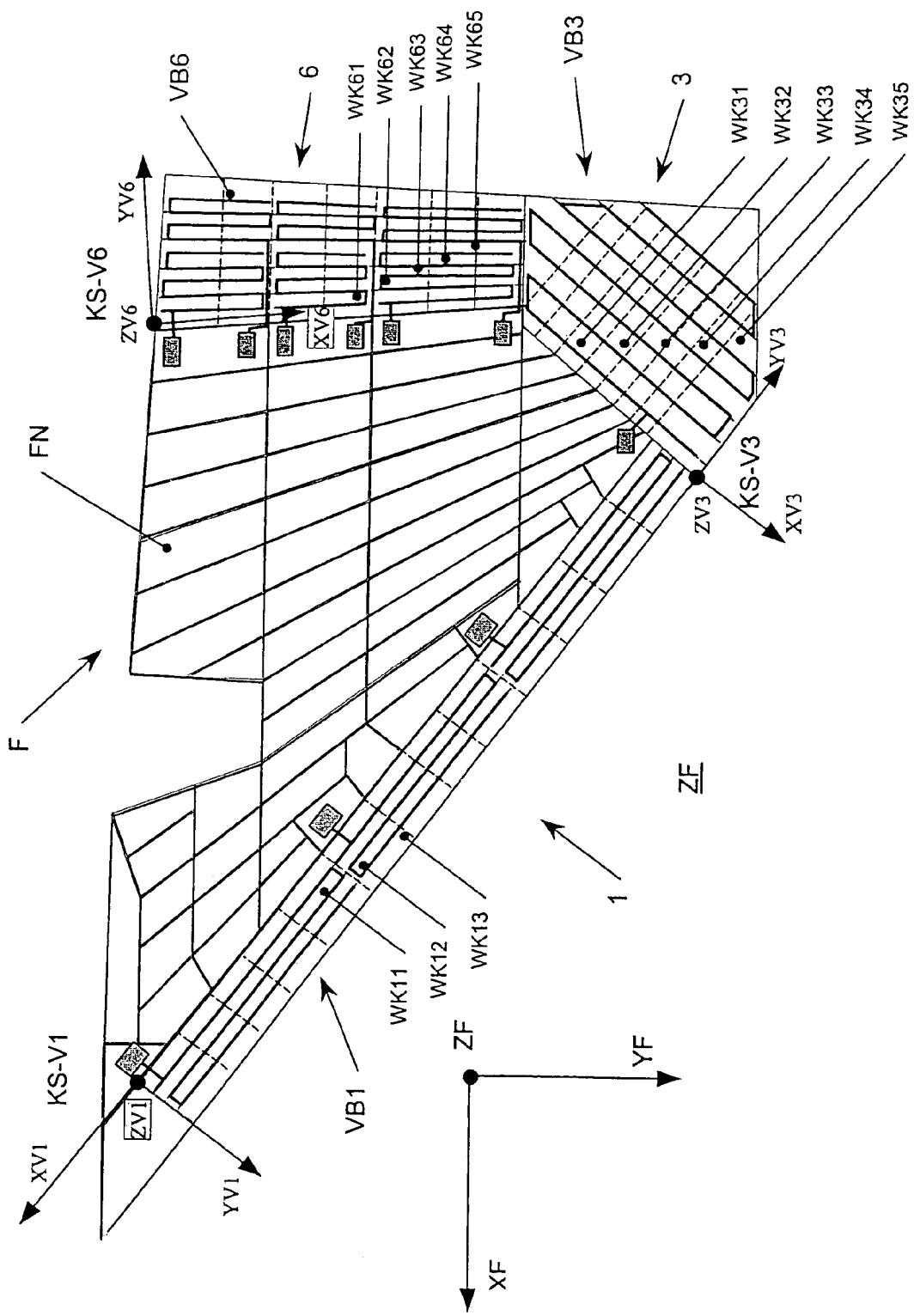
FIG. 4 the wing according to FIG. 3 or 2 in a diagrammatic plan view, whereby different arrangements of the adjustment mechanism according to the invention are marked on various adjustment areas of the aircraft and the orientation of the whirl chambers used according to the invention, FIG. 5 two adjustment positions of an adjustment area to form the aileron of the wing according to FIG. 2, 3 or 4 with a diagrammatic representation of a further embodiment of the adjustment mechanism according to the invention, FIG. 6 a plan view of a wing of the aircraft shown in FIG. 1 with an adjustment area at the wing tip, whereby local coordinate systems are alternatively marked, FIG. 7a the wing according to FIG. 6 in a first adjustment position in a view from the front with reference to the aircraft longitudinal axis, FIG. 7b the wing according to FIG. 6 in the representation according to FIG. 7a in a second adjustment position, FIG. 8 a spatial representation of the adjustment mechanism according to the invention of the adjustment area according to FIG. 6 in the adjustment position according to FIG. 7a in which alternatively the local coordinate systems used in the specification are marked, FIG. 9a a spatial representation of a further embodiment of the adjustment mechanism according to the invention for the aileron of the aircraft shown in FIG. 2, whereby the upper part of the whirl chambers of the adjustment mechanism from the observer's viewpoint is not marked to clarify the operating principle, FIG. 9b the representation of a coupling of two adjustment mechanisms on the basis of the adjustment mechanism of FIG. 9a, FIG. 10a on the basis of the representation of FIG. 9a, a spatial representation of a further embodiment of the adjustment mechanism according to the invention for the aileron of the aircraft shown in FIG. 2 as an adjustment area in a neutral position in which two drive systems are used, FIG. 10b the embodiment of the adjustment mechanism according to the invention according to FIG. 10a, whereby the adjustment area is shown in a further position, FIG. 11 a whirl chamber of the adjustment mechanism shown in FIGS. 10a and 10b together with the relevant drive tubes, FIG. 12a a sectional representation of the aileron adjustment area according to FIGS. 9a, 9b and 10a, 10b in a first extreme position in which the adjustment area is directed upwards, FIG. 12b a sectional representation of the aileron adjustment area according to FIGS. 9a, 9b and 10a, 10b in a neutral position, FIG. 12c a sectional representation of the aileron adjustment area according to FIGS. 9a, 9b and 10a, 10b in a second extreme position in which the adjustment area is directed downwards, FIG. 13a a sectional representation of the aileron adjustment area according to FIGS. 9a, 9b and 10a, 10b in a further adjustment position in which the adjustment area is only partially adjusted or curved, FIG. 13b a sectional representation of the aileron adjustment area according to FIGS. 9a, 9b and 10a, 10b in a further adjustment position in which the adjustment area features two curvatures, FIG. 13c a sectional representation of the aileron adjustment area according to FIGS. 9a, 9b and 10a, 10b in a further adjustment position in which the adjustment area features two curvatures different from the representation in FIG. 13b.

The wing F according to FIG. 3 is shown in FIG. 4 in a plan view with adjustment areas and marked adjustment mechanisms of the wing. Whirl chambers and relevant drive tubes for the adjustment areas VB1, VB3, VB6 are thereby indicated diagrammatically by boundary lines. Only the drive tubes lying near to a skin are thereby shown. Each adjustment area VB or VB1, VB3, VB6 is formed of at least one whirl chamber line or an arrangement of whirl chambers arranged next to one another. In the example shown, three whirl chamber rows with respectively four whirl chambers WK11, WK12, WK13, WK14 are provided for the adjustment area VB1 of the slat 1. A whirl chamber line with five whirl chambers WK31, WK32, WK33, WK34, WK35 is arranged in the adjustment area VB3. Three whirl chamber lines with respectively five whirl chambers WK61, WK62, WK63, WK64, WK65 are arranged in the adjustment area VB6.

For the adjustment areas VB1, VB3 and VB6 the coordinate systems KS-V1, KS-V3 and KS-V6 respectively with the adjustment area longitudinal direction XV1, XV3 or XV6, the adjustment area lateral direction YV1, YV3 or YV6 and the adjustment area depth direction ZV1, ZV3 or ZV6 are taken as a basis for the further description of the invention. These labels are used analogously in the further figures. With reference to the adjustability of the adjustment mechanism according to the invention, for the respective adjustment or wing range a wing range center plane ME, a first or upper reference plane BF1 and a second or lower reference plane BF2 (FIGS. 8 or 12a, 12b, 12c) can be selected. The reference planes BF1, BF2 are preferably the upper or lower skin of the adjustment area or wing.

Figure 5:
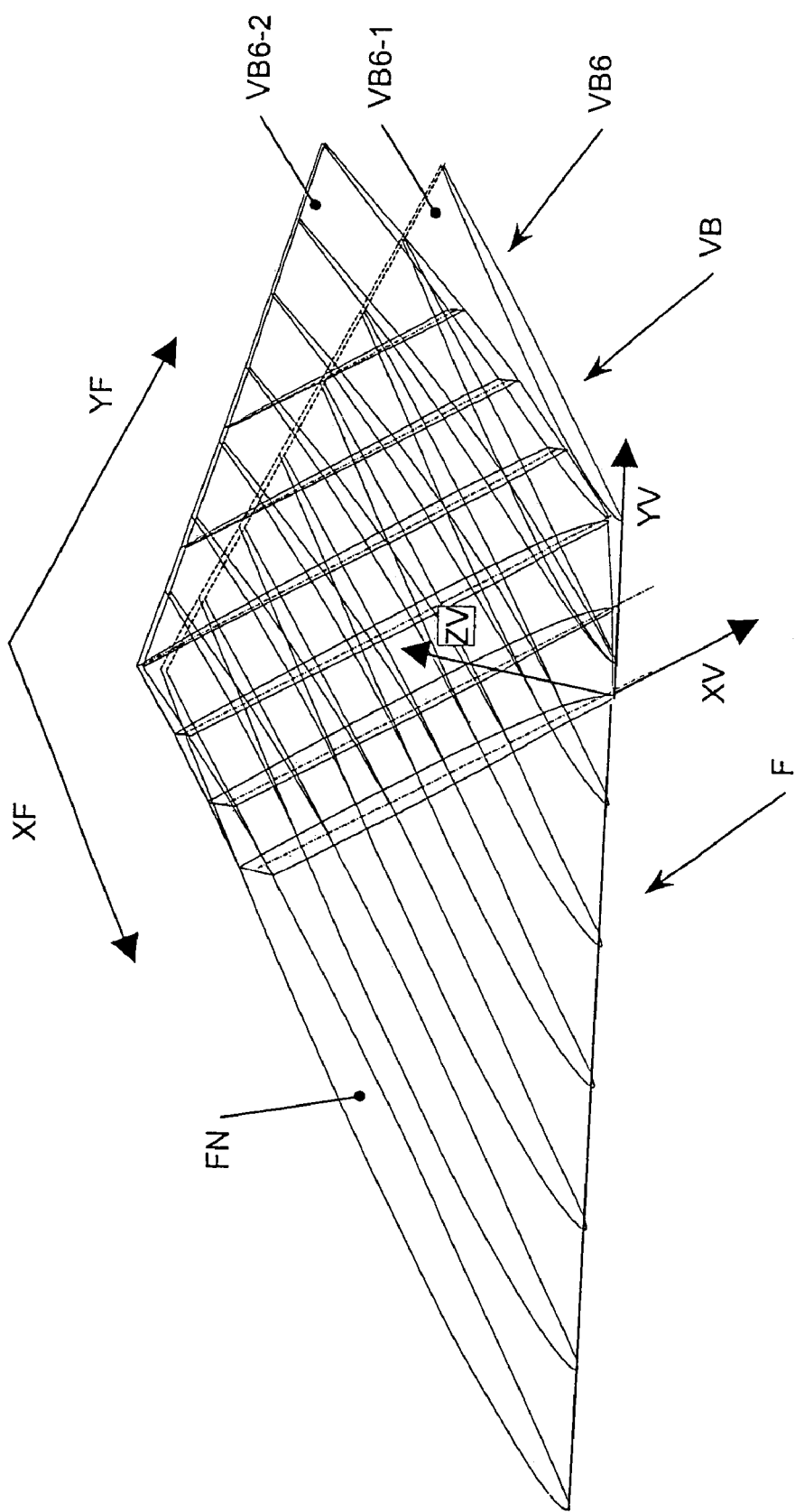
Figure 6:
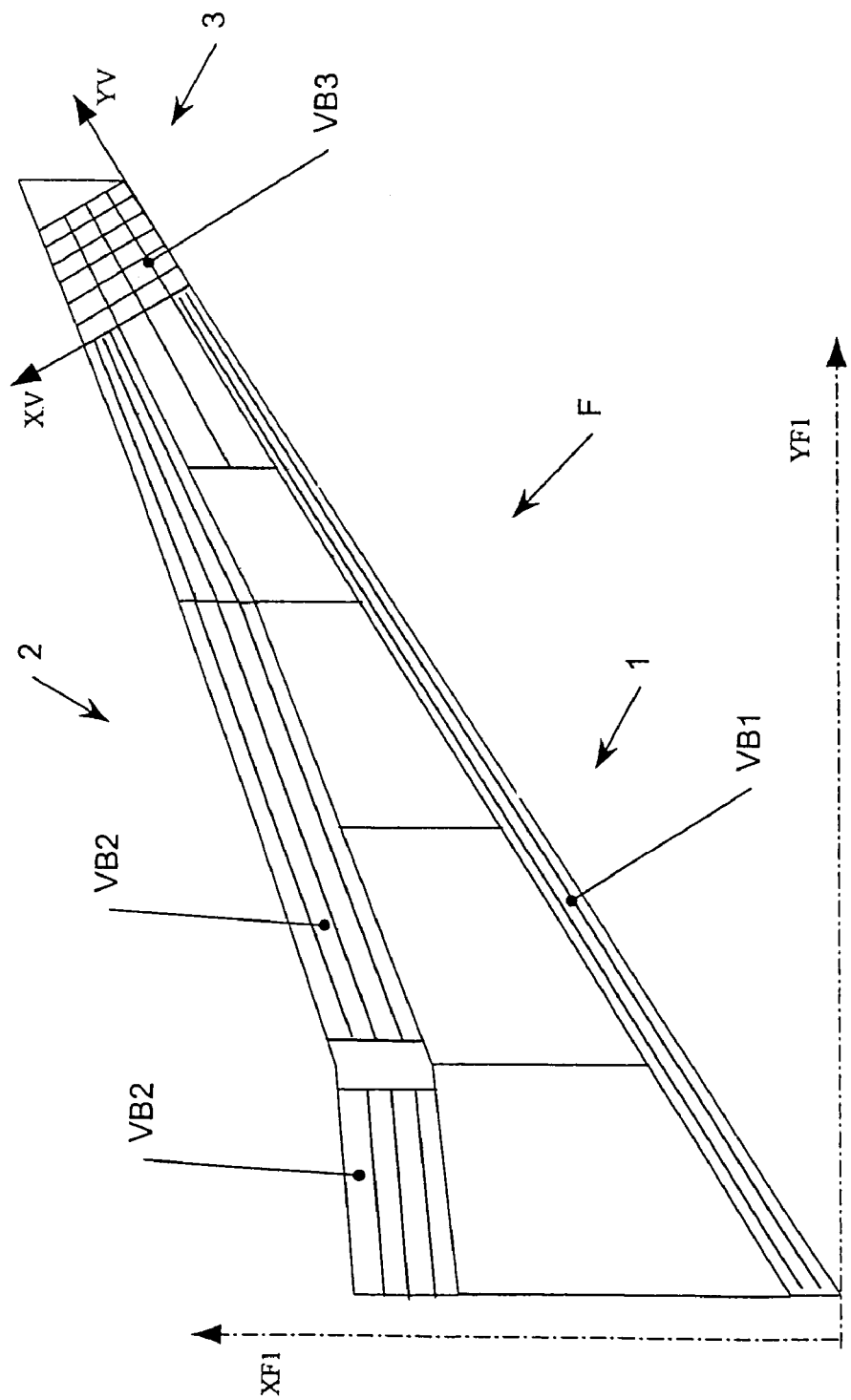
Figure 7A:
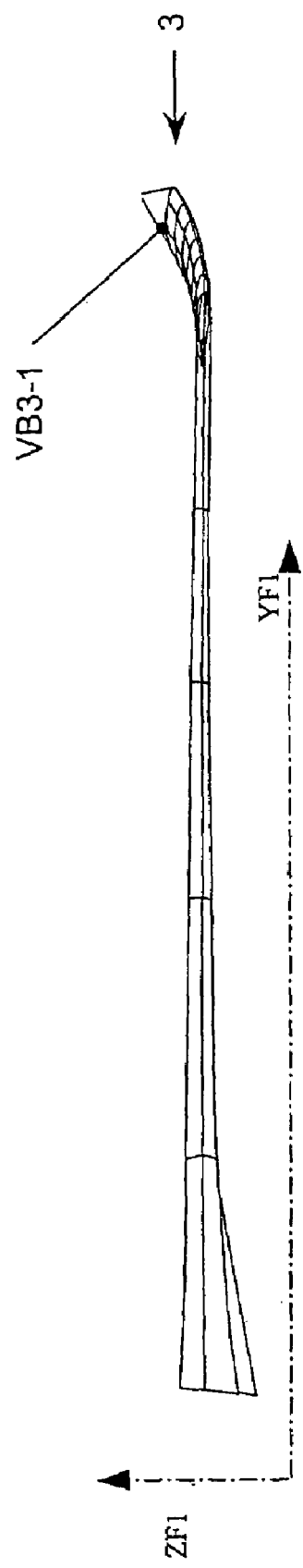
Figure 7B:
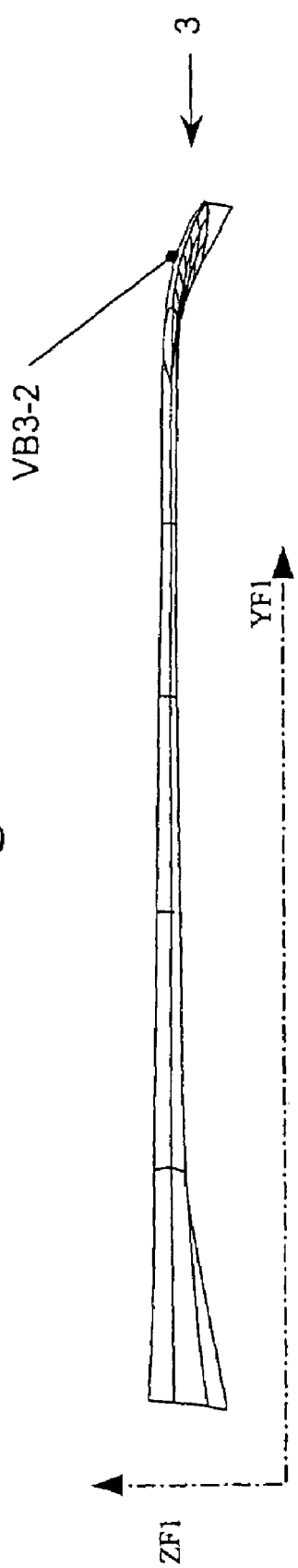

FIG. 5 shows diagrammatically the changeability or adjustment of the adjustment area VB according to the invention with the example of the aileron of the wing according to FIG. 2, 3 or 4 on the basis of two adjustment positions VB6-1 and VB6-2. Furthermore FIG. 6 shows a wing of the aircraft shown in FIG. 1 in an embodiment in which an adjustment area VB3 according to the invention is arranged on the wing tip. Two adjustment positions VB3-1 and VB3-2 can be seen in FIGS. 7a or 7b.

Figure 8:
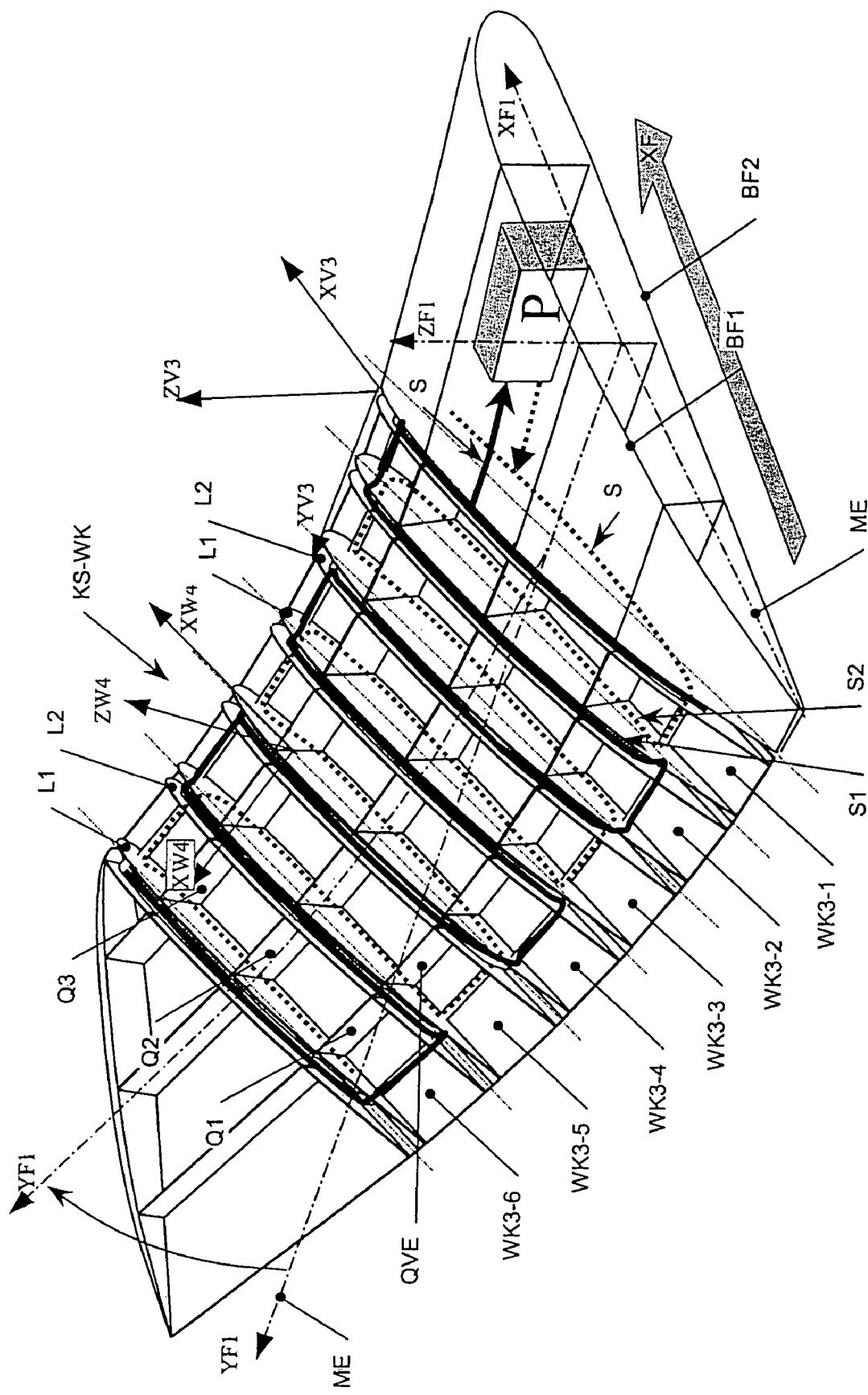

The adjustment mechanism according to the invention for an adjustment area VB is explained in detail and in its operation below on the basis of the adjustment area VB3 shown in FIG. 8 of the aircraft shown in FIG. 1:

The adjustment area VB3 shown in FIG. 8 features six whirl chambers WK3-1, WK3-2, WK3-3, WK3-4, WK3-5 and WK3-6 that are arranged next to one another in the adjustment area lateral direction YV3 or in the wing longitudinal direction YF1. A coordinate system KS-WK with a whirl chamber longitudinal direction XW, a whirl chamber lateral direction YW and a depth direction ZW running orthogonally to them can be assigned to each whirl chamber. According to the invention each whirl chamber WK is formed of at least two longitudinal stiffening elements LVE or L1 and L2 spaced apart from one another and at least one lateral stiffening element QVE connecting these to one another laterally. In the embodiment of the whirl chamber WK according to FIG. 8, three lateral stiffening elements Q1, Q2 and Q3 are arranged for each whirl chamber WK.

In the embodiment of the adjustment mechanism according to the invention according to FIG. 8, the plane formed by the wing span direction XF and the wing longitudinal direction YF represents a reference plane or center plane ME. Drive tube sections provided according to the invention are provided spaced apart from this plane, with which drive tube sections adjacent whirl chambers can be rotated or swiveled relative to one another when a volume decrease or volume increase is caused in the drive tube sections by the circulation or volume transfer of the pressure medium contained therein due to control commands of a control mechanism. To this end a first S1 and a second S2 drive tube section is provided between two respectively adjacent stiffening elements L1 and L2. In the operation according to the invention the drive tube sections are filled with a pressure medium or fluid and lie against the side walls facing them of the stiffening elements L1 and L2 at a minimal pressure exerted by the pressure medium on the tube walls. The first drive tube section S1 is arranged near to the first reference plane BF1 or skin and the second drive tube section S2 is arranged near to the second reference plane BF2 or skin.

An adjustment of the adjustment area by the adjustment mechanism takes place around an axis that generally runs laterally or at an angle to the whirl chamber longitudinal direction XW. The whirl chamber longitudinal direction XW is the same as the axial direction of a joint G (not shown, in FIG. 8) that respectively connects, two adjacent longitudinal stiffening elements LVE to one another in a jointed manner. The joint provided between respectively adjacent longitudinal stiffening elements L1, L2 can be realized by two eye and fork arrangements one of which is respectively attached to a longitudinal stiffening, element L1 or L2 and which are connected to one another via a joint bolt (cf. FIGS. 9*a* through 19).

Respectively at least one first drive tube section S1 and respectively at least one second drive tube section (S2) is thus arranged between respectively adjacent longitudinal stiffening elements LVE, which drive tube sections are respectively connected to a pump P for providing a predetermined pressure via a pressure medium so that the axis of the joint G runs between the drive tube sections S1, S2, whereby the pump is functionally connected to a control device in order to swivel adjacent whirl chambers WK around the joint axis by complementary pressure changes in the first and second drive tube section S1, S2 on the basis of control instructions.

In one embodiment of the invention several first or second drive tube sections arranged next to one another are connected to one another in the adjustment area lateral direction YV. In FIG. 8 this embodiment is indicated diagrammatically by a solid or dotted line. Furthermore a pump P is shown that is connected to the first as well as to the second drive tube sections. The pump P is preferably embodied as a circulating pump and is provided to increase or reduce the volume of the pressure medium contained in the first drive tube sections on the basis of corresponding control commands and at the same time to reduce or increase the volume of the pressure medium contained in the second drive tube sections.

For example, through a volume increase in the second drive tube sections S2 and a simultaneous volume reduction in the first drive tube sections S1, the distance between respectively adjacent longitudinal stiffening elements L1, L2 is reduced near the first reference plane BF1 and increased near the second reference plane BF2. The adjustment position of the adjustment area VB3 shown in FIG. 8 thus results. In the embodiment according to FIG. 8, a predetermined curvature of the adjustment area results with different volume conditions, since the different tube sections S1, S2 connected to one another are respectively connected to one another. Alternatively, it can be provided that individual tube sections can be acted on in a targeted manner with different volumes, e.g., by assigning different pumps, so that the curvature of the adjustment area can also be adjusted as a function of control commands to be passed on to the respective pumps.

The drive tube sections can extend over the entire length or most of the length (whirl chamber longitudinal direction XW) of the stiffening elements L1 and L2 or only over a part of this length. The drive tube sections can be connected to one another via tube connections SV. The drive tube sections can be connected to one another in particular such that several first S1 or second S2 drive tube sections are formed from one continuous drive tube S.

In the embodiment of the adjustment mechanism according to the invention of FIG. 8, the longitudinal stiffening elements LVE are profiling elements or ribs of the adjustment area, whereas the lateral stiffening elements QVE hold the longitudinal stiffening elements LVE stable in a preset position relative to one another and thus can be regarded as spars.

In FIGS. 9*a*, 9*b* through 13*a*, 13*b*, 13*c* a further use of the adjustment mechanism according to the invention is shown in further embodiments with the example of the adjustment areas for a trailing edge wing VB2 or for an aileron VB6. In contrast to the embodiment according to FIG. 8, in these embodiments the lateral stiffening elements QVE act as profiling elements or ribs R of the adjustment area, whereas the longitudinal stiffening elements LVE hold the lateral stiffening elements QVE stable in a predetermined position relative to one another and act as spars. Analogous to the adjustment mechanism according to FIG. 8, the ribs R respectively connect two opposite longitudinal stiffening elements L1, L2. Two adjacent lateral stiffening elements QVE in the form of ribs R are connected to one another in a jointed manner via a joint G, G1, G2. In the embodiment shown this is realized by two eye and fork arrangements, one of which is respectively mounted on a longitudinal stiffening element L1 or L2 and which are connected to one another via a joint bolt. Other jointed connections according to the prior art can be used, depending on the application case. In particular, a solid joint or structural joint is suitable, as disclosed in German application DE 102 02 440.5.

In addition, in the embodiment of the adjustment mechanism according to FIGS. 9*a*, 9*b* through 13*a*, 13*b*, 13*c* stiffening elements VE are provided which connect two opposite longitudinal stiffening elements L1, L2 of the same whirl chamber WK to one another in order to absorb forces occurring in the whirl chamber lateral direction.

Furthermore, at least one first drive tube section S1 and one second drive tube section S2 is arranged between respectively two adjacent longitudinal stiffening elements L1, L2 near the first reference plane BF1 or near the second reference plane BF2. Through a volume increase in the first drive tube sections S1 and a volume reduction in the second drive tube sections S2, the first skin or reference plane BF1 is lengthened and the second skin or reference plane BF2 is shortened so that the adjustment position shown in FIG. 12*c* results. Inversely, the adjustment position shown in FIG. 12*a* results.

Through a control device that permits an isolated control of the individual drive tube sections, adjustments of the adjustment area can be made only partially or adjustments of the adjustment area with several curvatures can be achieved.

The drive systems with the drive tube sections and a control device of functionally assigned pumps to adjust the adjustment mechanism can be designed in different ways. In the embodiment of the adjustment mechanism according to FIG. 9*a*, the tube sections S1, S2 extend over respectively three whirl chambers arranged one behind the other in the whirl chamber longitudinal direction or between their corresponding longitudinal stiffening elements. Respectively one pump that can be controlled via the control device is thereby assigned to each group of whirl chambers arranged one behind the other in the whirl chamber longitudinal direction. This provides the possibility of adjusting the adjustment area with any desired curvatures.

Figure 9A:
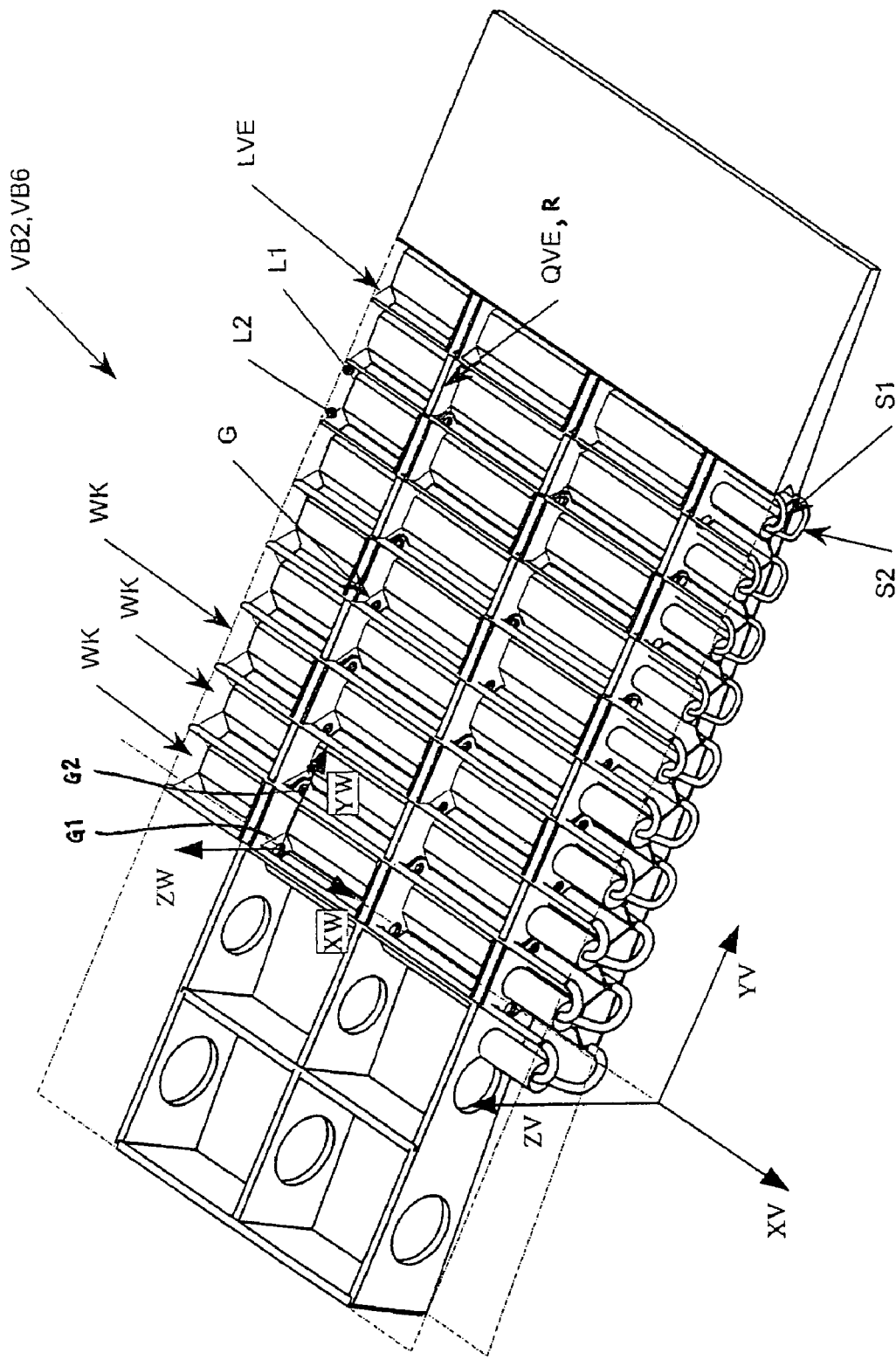
Figure 9B:
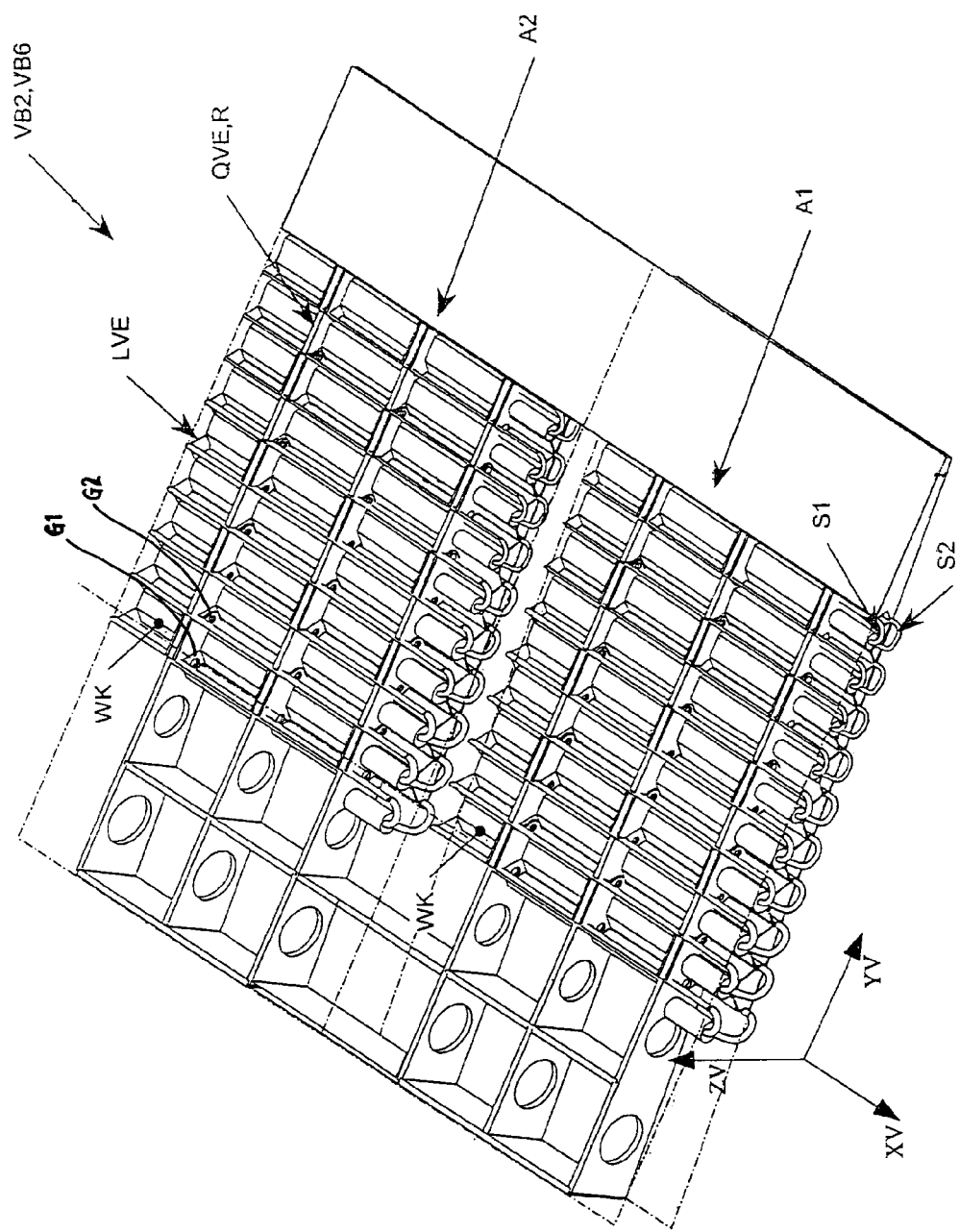

In the embodiment of the drive system according to FIG. 9*b*, in addition an individual pump is installed for each individual further whirl chamber WK arranged in the whirl chamber longitudinal direction. Thus, if necessary, an individual drive is provided for each whirl chamber WK of a group of whirl chambers arranged in the whirl chamber longitudinal direction XW. In this case these groups of whirl chambers WK with respectively one drive and arranged one behind the other in the longitudinal direction XW are mechanically coupled to one another. Two redundant drive systems A1, A2 thus result by the drive tubes for respectively one row RWK of whirl chambers WK.

Alternatively, in addition further groups of whirl chambers arranged in the whirl chamber lateral direction YW can also be supplied by one pump.

Figure 10A:
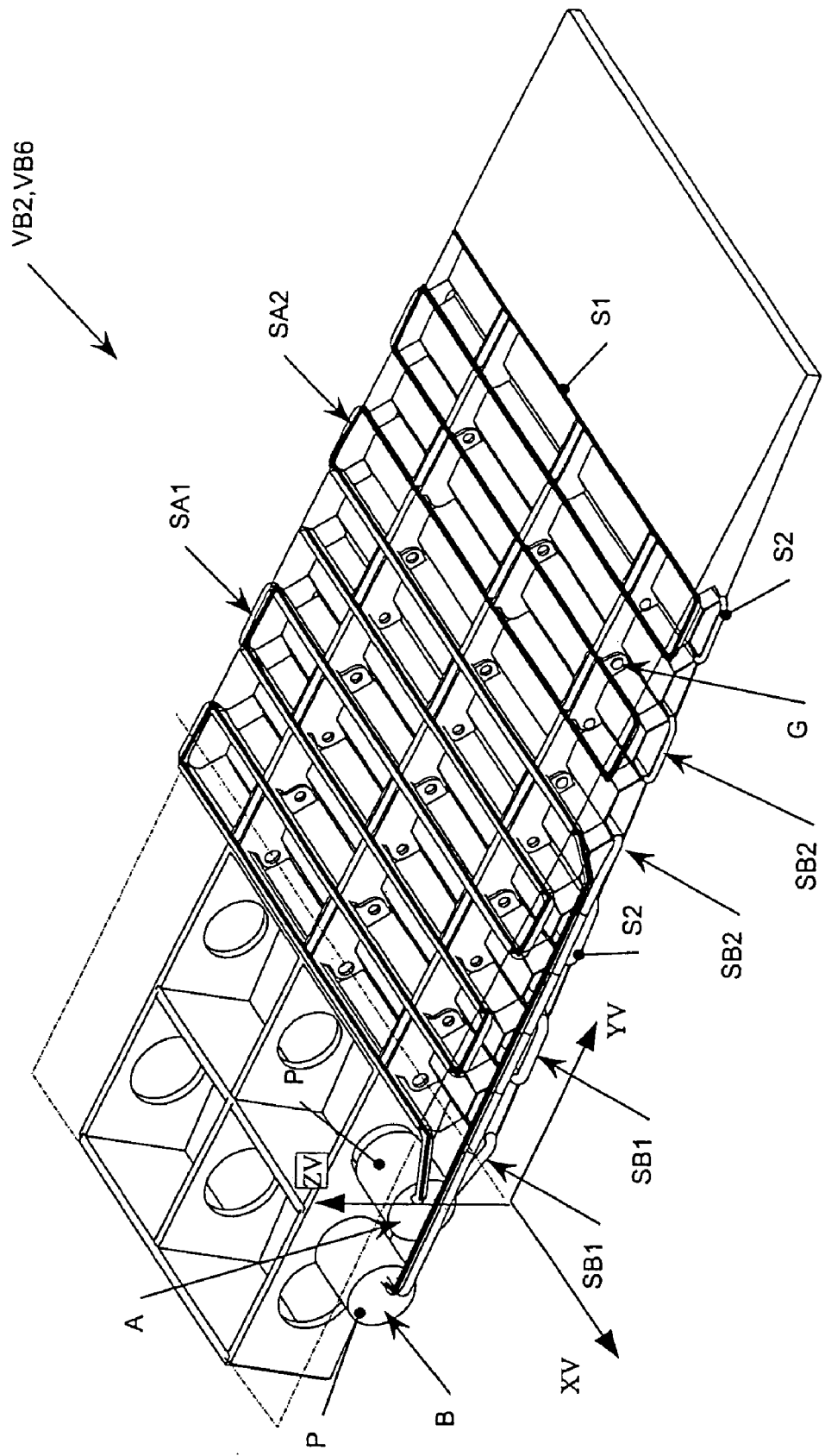
Figure 11:
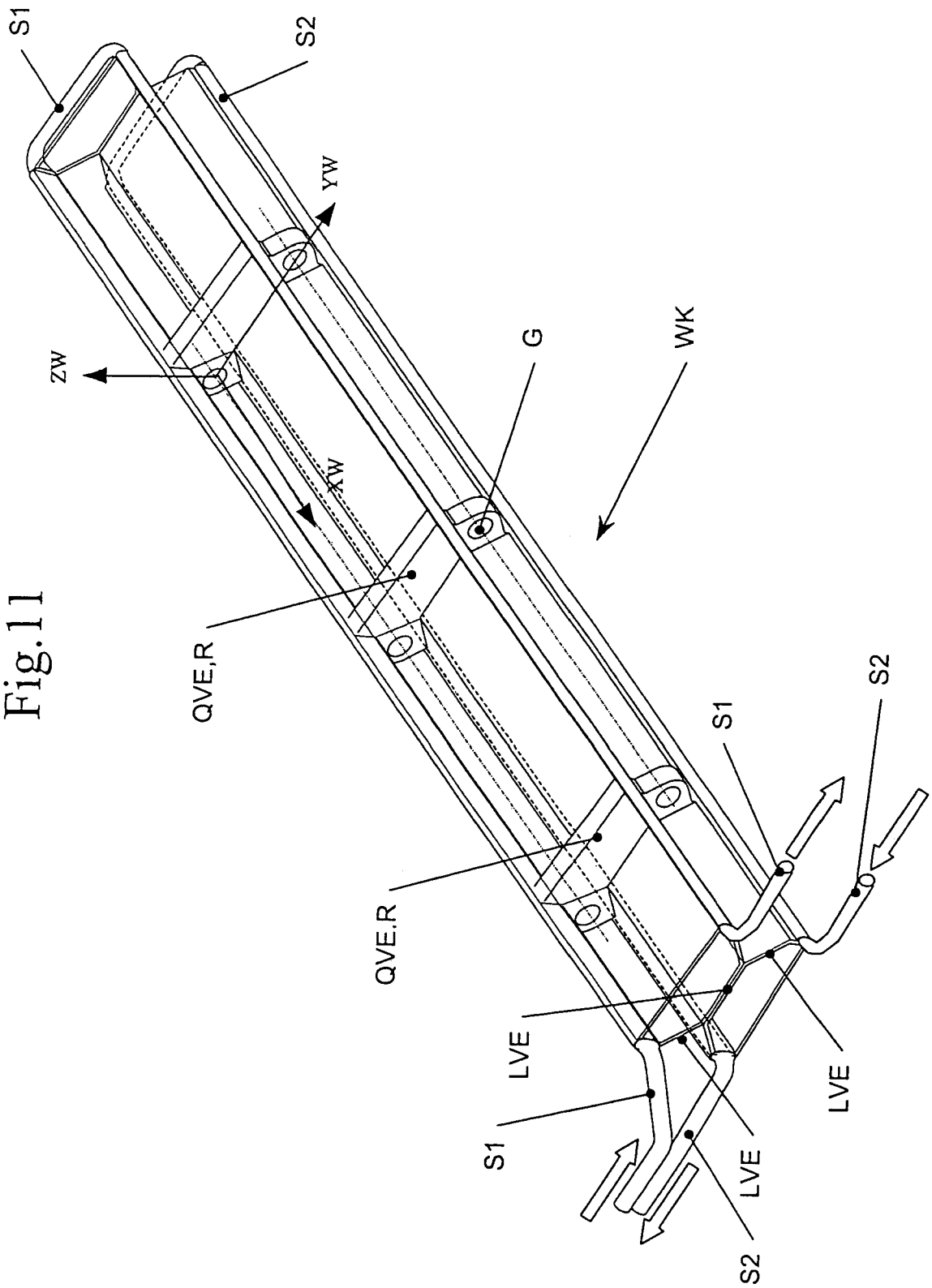
Figures 13A, 13B, 13C:
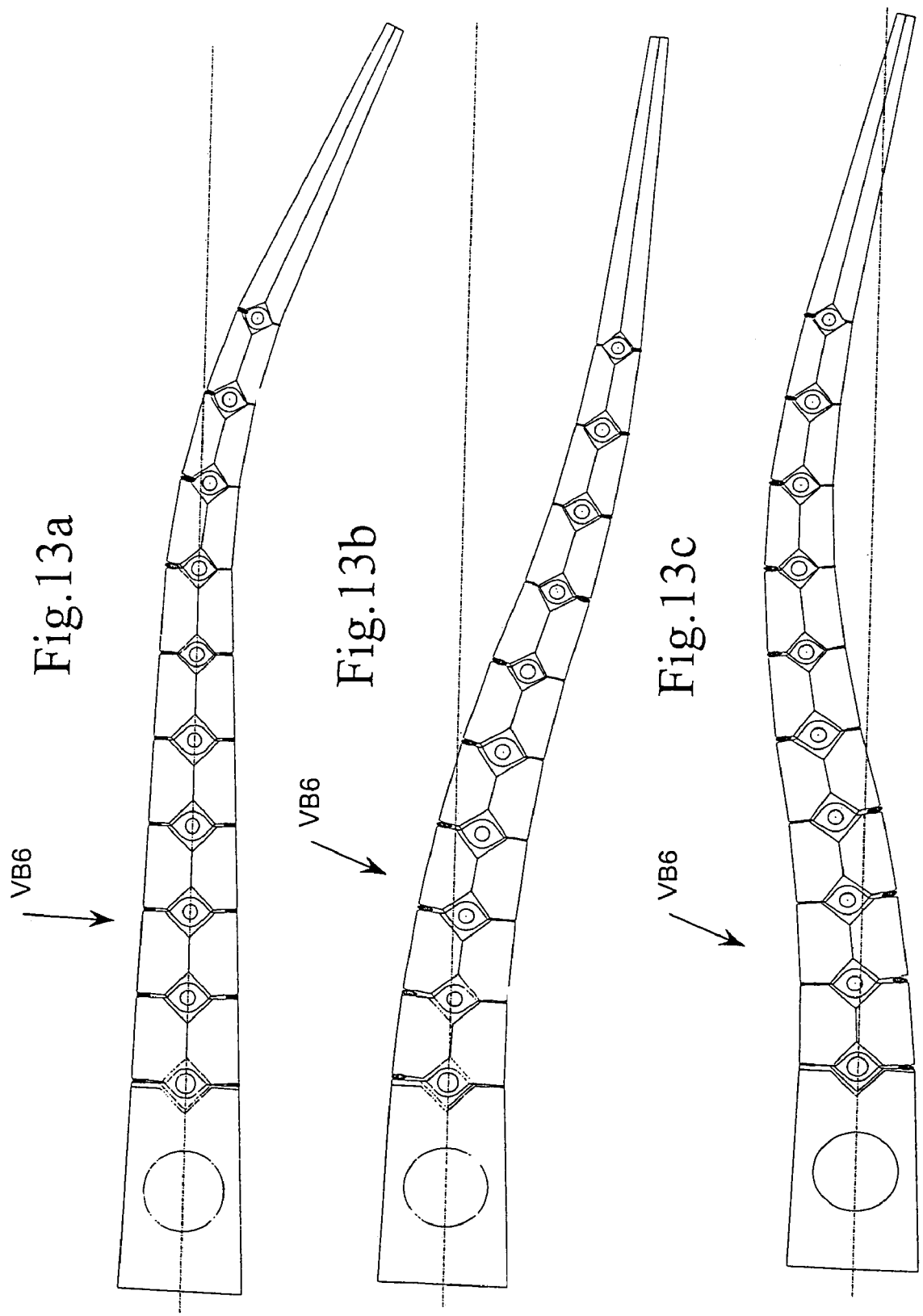
Figure 14A:
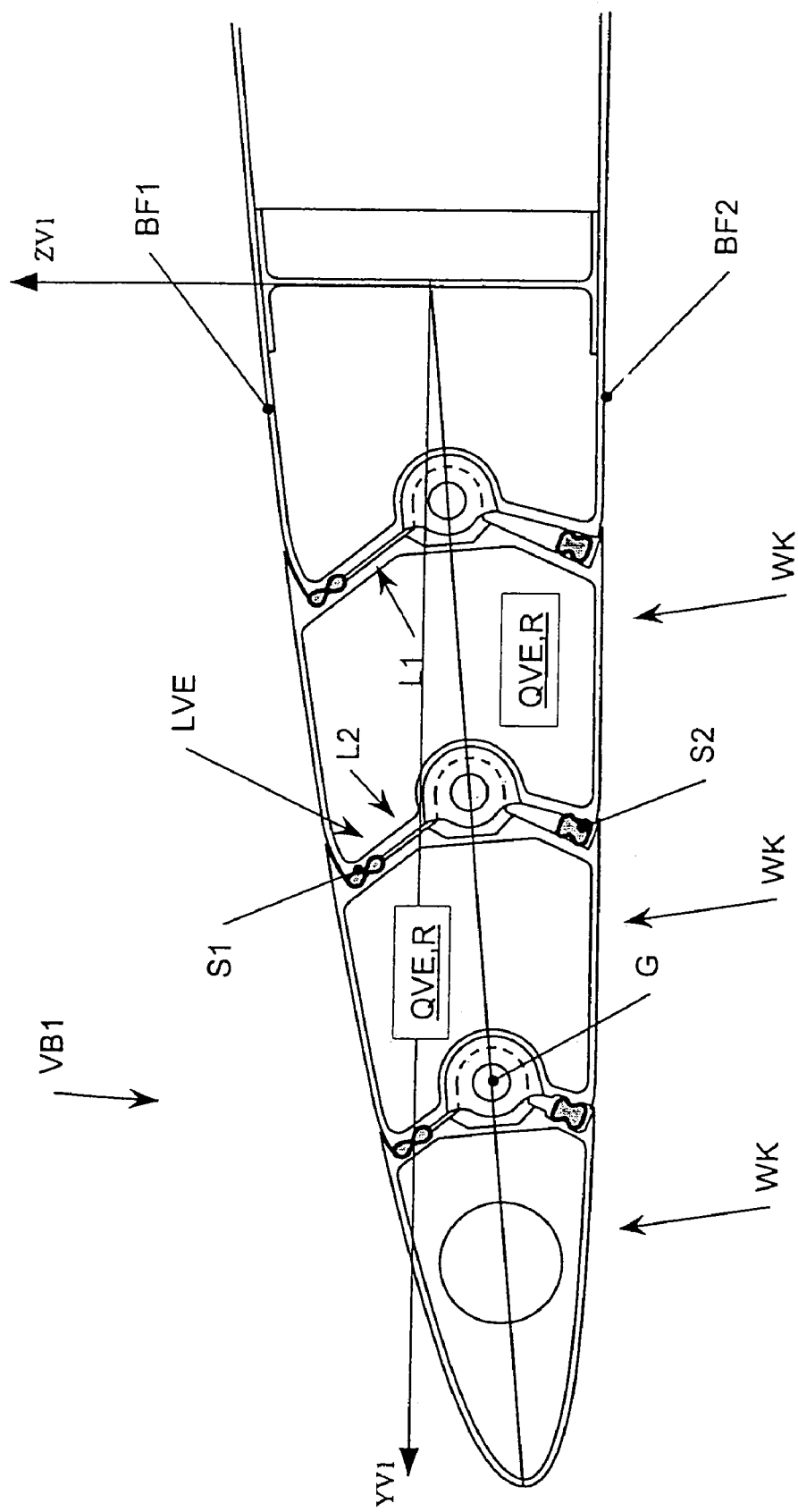
FIG. 14a a sectional representation in the adjustment area lateral direction with a representation of a further embodiment of the adjustment mechanism according to the invention for the leading wing of the aircraft shown in FIG. 2, whereby the adjustment mechanism is in a neutral position, FIG. 14b a sectional representation of the adjustment mechanism for the leading wing of the aircraft shown in FIG. 2, whereby the adjustment mechanism is in a further adjustment condition, FIG. 15a a diagrammatic representation of an embodiment of the jointed coupling of the drive of two adjacent whirl chambers of the adjustment mechanism according to FIGS. 8, 9a, 10a or 14a in a neutral position, FIG. 15b the embodiment of the jointed coupling of the drive of two adjacent whirl chambers according to FIG. 15a in a further adjustment condition, FIG. 15c the embodiment of the jointed coupling of the drive of two adjacent whirl chambers according to FIG. 15a in a further adjustment condition, FIG. 16 a diagrammatic representation of a further embodiment of the jointed coupling of the drive of two adjacent whirl chambers of the adjustment mechanism according to FIG. 8, 9a, 10a or 14a with a representation of the operating principle, FIG. 17 a diagrammatic representation of a further embodiment of the jointed coupling of the drive of two adjacent whirl chambers of the adjustment mechanism according to FIG. 8, 9a, 10a or 14a, FIG. 18a a diagrammatic representation of a further embodiment of the jointed coupling of the drive of two adjacent whirl chambers of the adjustment mechanism according to FIG. 8, 9a, 10a or 14a in a first adjustment condition, FIG. 18b a diagrammatic representation of a further embodiment of the jointed coupling of the drive of two adjacent whirl chambers of the adjustment mechanism according to FIG. 8, 9a, 10a or 14a in a second adjustment condition, FIG. 19 a representation of the operating principle of a drive system according to the invention on the basis of the embodiment of the jointed coupling of two adjacent whirl chambers according to FIGS. 18a, 18b, FIG. 20 a diagrammatic representation of a further embodiment of the jointed coupling of the drive of two adjacent whirl chambers of the adjustment mechanism according to FIG. 8, 9a, 10a or 14a with the use of structural joints, FIG. 21 a section in the adjustment area lateral direction with a representation of the internal structure of a further embodiment of the adjustment mechanism according to the invention with an additional telescopic drive for the trailing edge wing of the aircraft shown in FIG. 1, whereby the adjustment mechanism is in a neutral position, FIG. 22 the adjustment area according to FIG. 20 in a further adjustment condition or in an extended position.
Figure 14B:
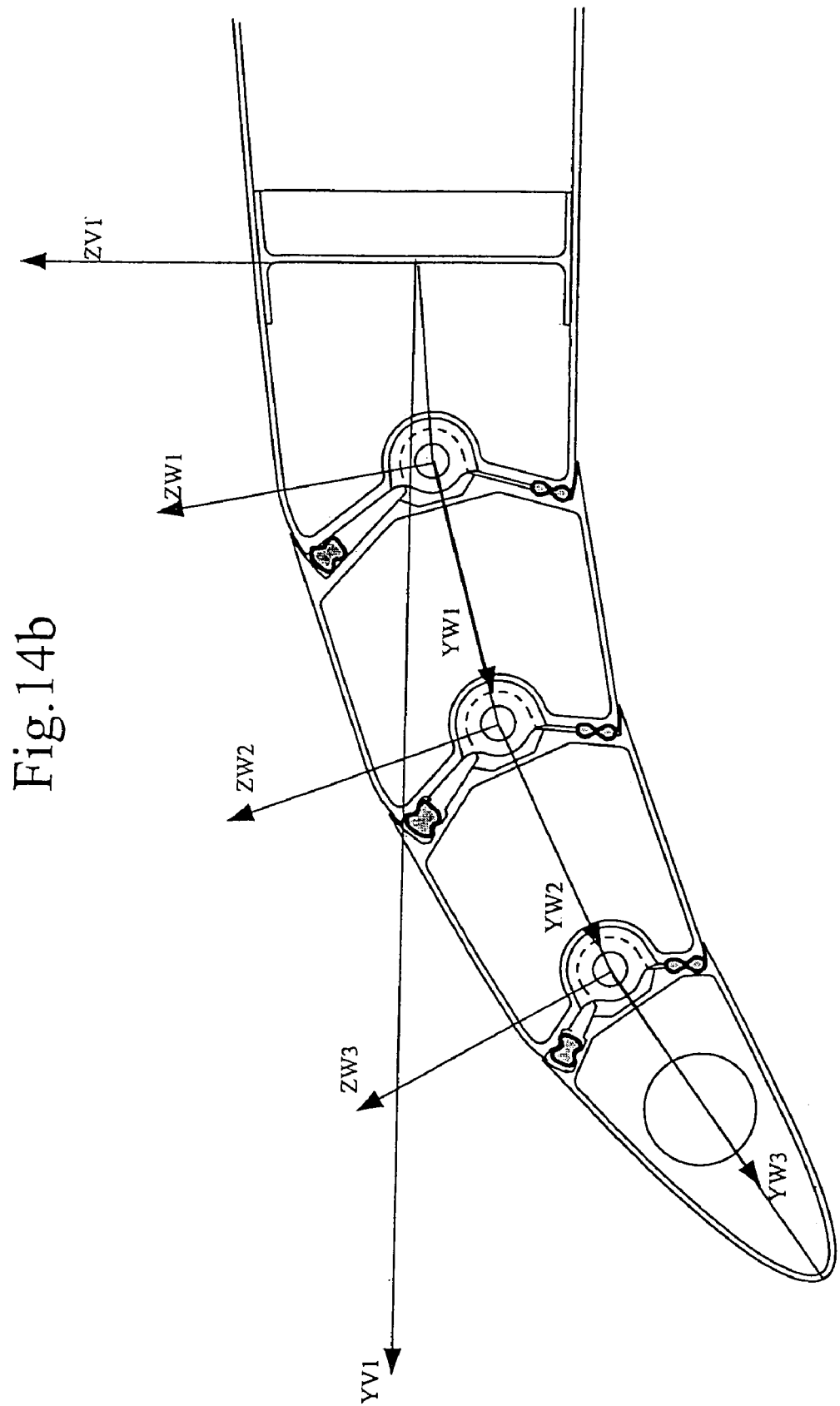

In FIGS. 10a and 10b drive tube sections that are arranged between groups of whirl chambers and that are connected to one another in a jointed manner in the whirl chamber lateral direction YW are connected to respectively one pump. This results in two drive systems A, B with respectively one pump P and respectively one first drive tube SA1, SB1 and respectively one second drive tube SA2 SB2, whereby the drive tubes respectively feature several drive tube sections S1, S2 according to the invention for adjusting different whirl chambers WK relative to one another.

According to the invention, two or more than two drive tube sections L1 or L2 can be arranged between respectively two adjacent longitudinal stiffening elements LVE. Depending on the arrangement of the drive tube sections, the size of the forces transferred by the drive tube sections or the lift or regulating distance achieved thereby can thus be changed and adapted (see FIGS. 12a–12c and 13a–13c).

Further embodiments of the adjustment mechanism according to the invention with several whirl chambers WK that are arranged next to one another and that can be swiveled relative to one another are shown in FIGS. 14 through 19, which whirl chambers form an adjustment area VB1 of the slat 1 of the aircraft shown in FIG. 1 or 2. Each whirl element WK features lateral stiffening elements QVE in the form of ribs R and longitudinal stiffening elements LVE (not shown) in the form of spars. The at least one first drive tube section S1 and the at least one second drive tube section S2 is arranged between respectively two adjacent longitudinal stiffening elements L1, L2 near the first reference plane BF1 or near the second reference plane BF2. Through a volume increase in the first drive tube sections S1 and a volume reduction in the second drive tube sections S2, the first skin or reference plane BF1 is lengthened and the second skin or reference plane BF2 is shortened so that the adjustment position shown in FIG. 14b results.

Alternative joint and force transmission elements are described below on the basis of a whirl chamber arrangement for a slat 1:

In the arrangement according to FIGS. 15a, 15b, 15c the joint is embodied by two force transmission elements K1, K2 that are respectively formed according to the eye and fork principle. The force transmission elements K1, K2 feature levers H1, H2 to form a lever arm with reference to the joint axis of the joint G. The levers of opposite force transmission elements K1, K2 feature bearing surfaces F facing one another to accept the at least one drive tube section S1 or S2. In the embodiment of FIGS. 15a and 15b, two drive tube sections S1 are inserted between the contact surfaces. The contact surfaces are positioned with respect to the axis of the joint G such that, when a compressive force is exerted on the respective opposite contact surfaces, a force component results in the whirl chamber lateral direction YW that with two levers per fork is at least half of the compressive force exerted by the respective drive tube section.

Figure 16:
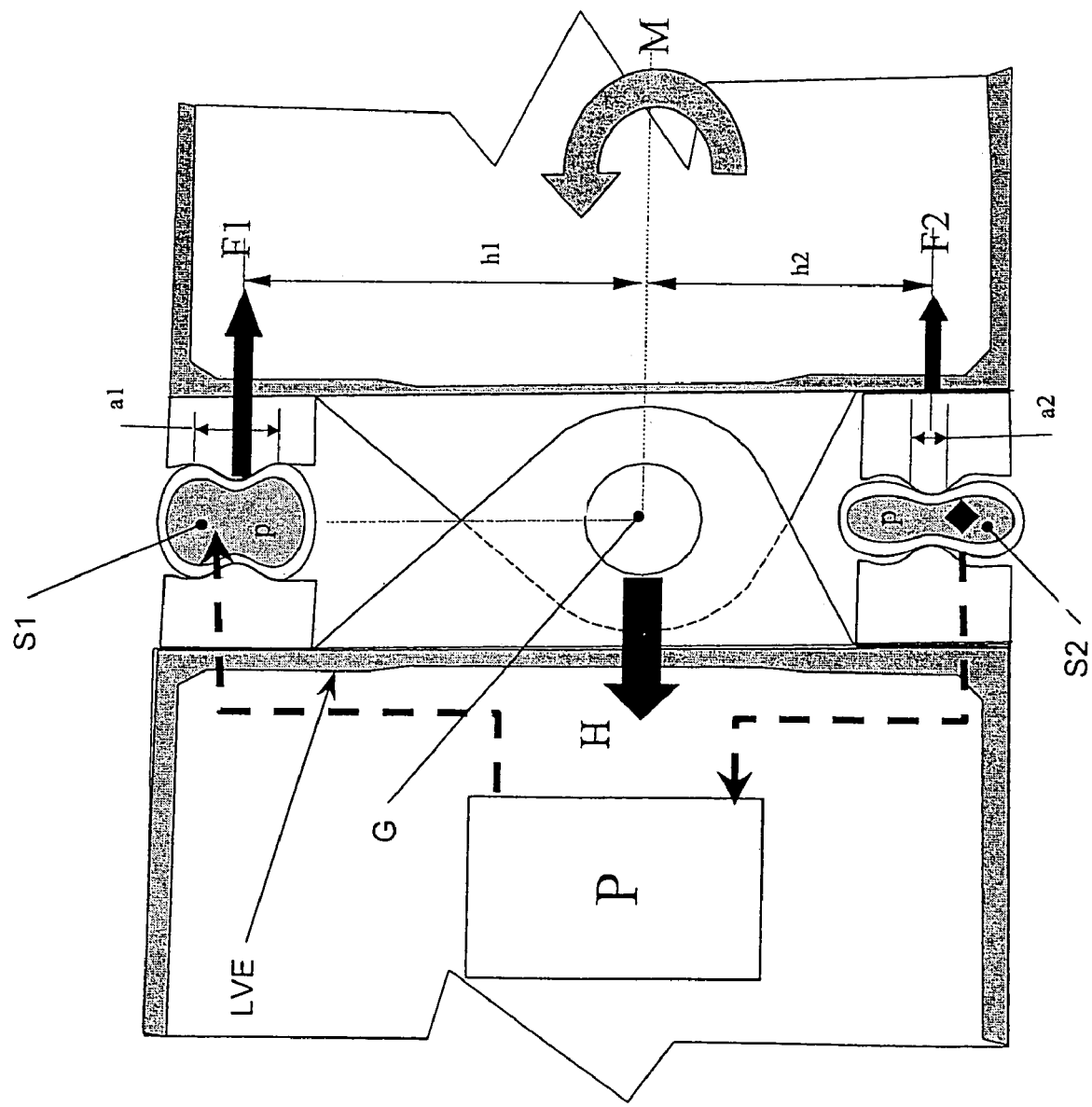

The force and pressure conditions that are present with this embodiment are explained on the basis of FIG. 16. The following designations have thereby been selected for physical values:

| | |
|---|---|
| a1, a2 = | Pressure trail |
| P = | Operating pressure |
| h1, h2 = | Lever arm |
| M = | Bending moment |
| H = | Hinge reaction |
| F1, F2 = | Bearing forces on the bearing surfaces F |

The following relationships thereby result:

| | |
|---|---|
| M = | $F1 \cdot h1 - F2 \cdot h2$ |
| H = | $F1 + F2$ |
| M = | $p \cdot a1 \cdot h1 - p \cdot a2 \cdot h2$ |
| M/p = | $a1 \cdot h1 - a2 \cdot h2$ |

In operation the drive tube sections S1, S2 must be acted on constantly with a sufficiently great pressure in order to hold a line or an arrangement of whirl chambers WK in a certain position to one another. In this arrangement a relatively great force thereby occurs on the joint bearing.

Figure 17:
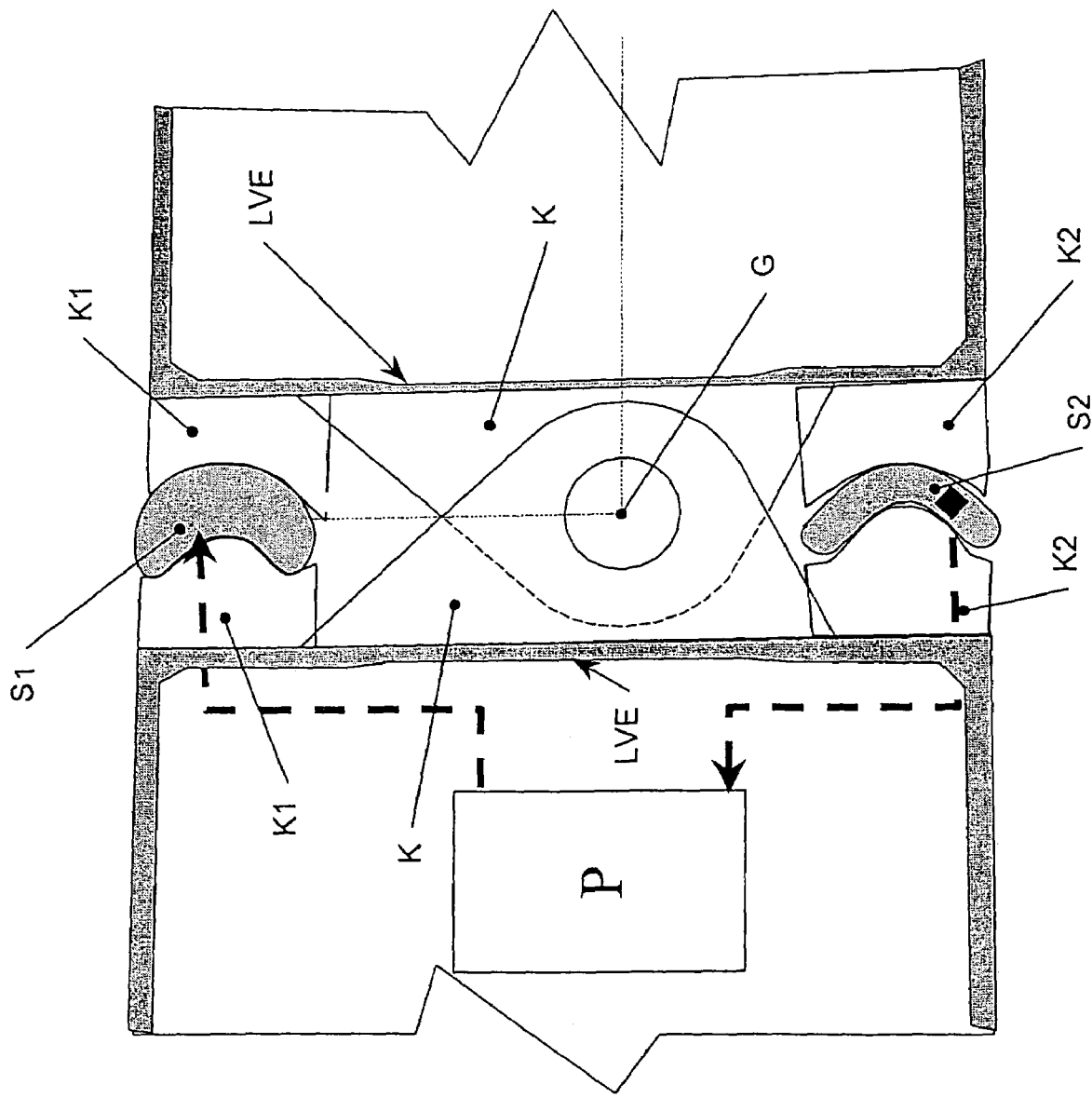

FIG. 17 shows an embodiment of the force transmission elements K1, K2 in which the contact surfaces F for the drive tube sections S1, S2 produce a greater pressure trail.

Only one force transmission element K is arranged in the embodiment according to FIGS. 18a, 18b, which force transmission element is articulated via a joint G on a longitudinal stiffening element LVE. In order to transmit moments to an adjacent whirl chamber WK, the effective lever arm of the force transmission element K extends in the direction of or at an acute angle to the whirl chamber lateral direction YW of the whirl chamber on which the moment is to be exerted. The bearing surfaces F facing one another to accept the at least one drive tube section S1 or S2 are positioned with respect to the axis of the joint G such that, when a compressive force is exerted on the respectively opposite contact surfaces, a force component develops in the whirl chamber depth direction ZW that with two pairs of contact surfaces per force transmission element K is at least half of the compressive force exerted by the respective drive tube section. In this embodiment it is advantageous that the bearing forces are relatively small. Moreover, the retention force to be exerted by the drive tube sections to hold a predetermined adjustment condition is smaller than in the embodiments according to FIGS. 15, 15b, 16, 17.

In the arrangement of FIGS. 18a, 18b, but also in the other embodiments according to the invention, one of the two drive tube sections S1, S2 together with the respective contact surfaces F can be omitted.

Figure 19:
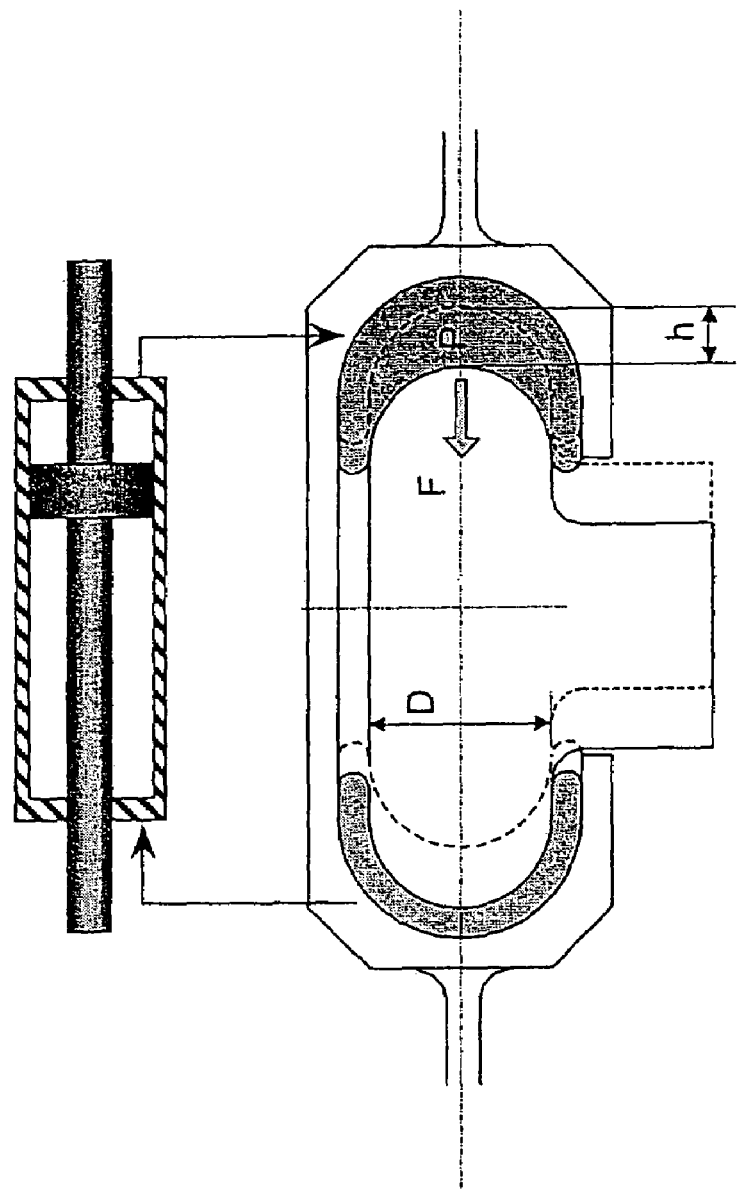
Figure 20:
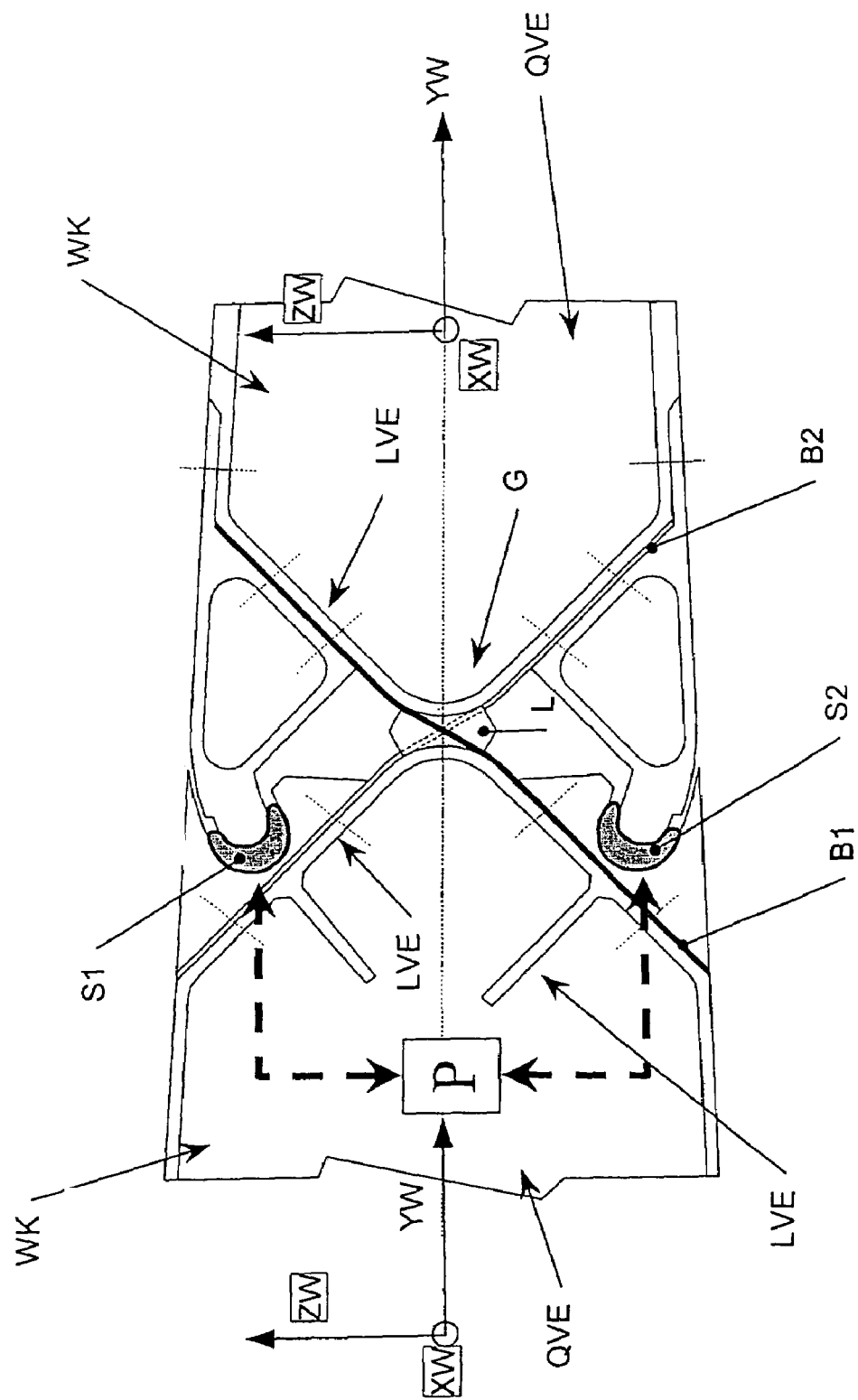

The operating principle according to the invention is illustrated on the basis of FIG. 19 according to which principle a volume change, e.g., in the first drive tube section S1 that occurs in a complementary manner to a volume change in the second drive tube section S2, causes a movement of corresponding whirl chambers WK According to FIG. 19, the following relationships result:

Operating pressure=p
Actuator lift=h
Volume transfer (unit length): V=D·h
Actuator force (unit length): F=p·D The joint G can also be embodied as a structural joint as shown in the embodiment of FIG. 20. The structural joint is preferably formed by two links B1, B2 that are reciprocally attached to the respective longitudinal stiffening elements of adjacent whirl chambers and the courses of which intersect in the joint axis in the whirl chamber longitudinal direction XW. In addition, the longitudinal stiffening elements LVE of adjacent whirl chambers WK are supported on bearing elements L that are situated next to the links B1, B2 seen in the whirl chamber longitudinal direction XW.

FIGS. 21, 22 show a further embodiment of the adjustment mechanism according to the invention with an additional telescopic drive for the trailing edge wing 2 of the aircraft shown in FIG. 1 so that an adjustment area VB2 results (FIG. 1). The telescopic drive T in general can be an actuator that can be adjusted in the rotational axis direction of the adjustment area. The telescopic drive T is arranged between the wing area of the aircraft and the adjustment area according to the invention. In this manner the situation and position of the adjustment area according to the invention as a whole can be changed and adjusted with respect to the wing area of the aircraft.

The drive tube section provided according to the invention can also be embodied as a fluid actuating drive according to DE 100 09 157 A1, i.e., as a fluid actuating drive for translational movement of a first and a second structural parts lateral to a gap between these parts relative to one another, with a housing filled with a pressure medium, which housing in its longitudinal direction runs along the gap and is connected therewith, whereby the width of the gap is dependent upon the relative position of the opposing side walls of the housing, which side walls can be moved against one another with a pressure medium for the movement of the structural parts, whereby the interior of the first housing is filled by a flexible tube and the side walls along the gap are alternately connected in areas to the first and second structural part. The structural parts are thereby connected to the longitudinal stiffening elements LVE.

An outer housing can thereby be provided outside the first housing, the side walls of which lying against the side walls of the first housing are respectively connected to a structural part, whereby the area between the first housing and the outer housing can be acted on with pressure medium and whereby the tube in the first housing features an elasticity that can be disregarded and that respectively another flexible tube with elasticity that can be disregarded is located in the longitudinal direction at the side of the first housing in the space between it and the second housing on each side of the first housing, whereby the wall of the outer housing is fixed to the first housing such that the movement of the side walls of the first housing takes place through a pressure medium circulation of the pressure medium between the tube and the other tubes.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An adjustment mechanism for an adjustment area of a variable-shape flow surface with two opposite skin surfaces, comprising:
   a plurality of whirl chambers swivelably arranged next to one another so that the whirl chambers are swivelable relative to one another;
   said whirl chambers comprising lateral stiffening elements and longitudinal stiffening elements;
   joints structured and arranged to jointedly couple said lateral stiffening elements and said longitudinal stiffening elements of said whirl chambers
   a first drive tube section and a second drive tube section being arranged between adjacent longitudinal stiffening elements;
   a pump coupled to said first and second drive tube sections;
   a control device functionally connected to said pump to swivel adjacent whirl chambers around joint axes via complementary volume changes in said first and second drive tube sections.

2. The adjustment mechanism in accordance with claim 1, wherein said pump provides a predetermined volume in said first and second drive tube sections via a pressure medium.

3. The adjustment mechanism in accordance with claim 1, wherein said joint axes run between said first and second drive tube sections.

4. The adjustment mechanism in accordance with claim 1, wherein said pump provides the complementary volume changes through circulation or volume transfer of the pressure medium.

5. The adjustment mechanism in accordance with claim 4, wherein said control device is structured and arranged to control operation of said pump.

6. The adjustment mechanism in accordance with claim 1, wherein said first and second drive tube sections are connected to one another.

7. The adjustment mechanism in accordance with claim 6, wherein several tube sections composed of at least first and second drive tube sections are formed from a continuous drive tube.

8. The adjustment mechanism in accordance with claim 1, wherein several drive tube sections are connected to one another and supplied by said pump.

9. The adjustment mechanism in accordance with claim 1, wherein individual drive tube sections are pressurizable in a targeted manner with individual pumps so that the curvature of an adjustment area is adjustable as a function of commands from said control device to said pump.

10. The adjustment mechanism in accordance with claim 1, wherein said lateral stiffening elements function as ribs of an adjustment area and said longitudinal stiffening elements function as ribs.

11. The adjustment mechanism in accordance with claim 1, wherein said lateral stiffening elements function as spars of an adjustment area and said longitudinal stiffening elements function as ribs.

12. The adjustment mechanism in accordance with claim 1, wherein said first and second drive tube sections extend over a group of several whirl chambers arranged one behind the other in a whirl chamber longitudinal direction.

13. The adjustment mechanism in accordance with claim 12, wherein volumes for said first and second drive tubes of each group of whirl chambers are separately adjustable.

14. The adjustment mechanism in accordance with claim 1, further comprising:

additional whirl chambers that are mechanically coupled said plurality of whirl chambers, wherein said first and second drive tube sections are arranged between adjacent ones of said additional whirl chambers.

15. The adjustment mechanism in accordance with claim 14, further comprising a further pump to separately adjust pressures in said first and second drive tube sections associated with said additional whirl chambers.

16. The adjustment mechanism in accordance with claim 14, wherein said plurality of whirl chambers and said further whirl chambers are arranged one behind the other in a whirl chamber lateral direction and are supplied by an individual pump.

17. The adjustment mechanism in accordance with claim 1, wherein several drive systems are formed by said drive tube sections positioned between groups of whirl chambers that are jointedly connected to one another in a whirl chamber lateral direction, and said drive systems comprise one first drive tube, one second drive tube, and one pump.

18. The adjustment mechanism in accordance with claim 17, wherein several drive tube sections are positioned to adjust two adjacent whirl chambers relative to one another.

19. The adjustment mechanism in accordance with claim 1, wherein several drive tube sections are arranged between two adjacent longitudinal stiffening elements.

20. The adjustment mechanism in accordance with claim 1, wherein said joint comprises two force transmission elements with levers structured and arranged to form a lever arm with reference to a joint axis.

21. The adjustment mechanism in accordance with claim 20, wherein said levers have bearing faces arranged to face each other and to accept at least one tube section in order to impart opposite forces on said bearing faces.

22. The adjustment mechanism in accordance with claim 21, wherein said contact surfaces are positioned with respect to said joint axis such that, when a compressive force is exerted on the respective opposite contact surfaces, a force component results in the whirl chamber lateral direction that with two levers per fork is at least half of the compressive force exerted by the respective drive tube section.

23. The adjustment mechanism in accordance with claim 20, wherein one force transmission element is arranged between two whirl chambers, and an effective lever arm of said two whirl chambers runs at an acute angle to the whirl chamber lateral direction on which the moment is to be exerted and the contact surfaces to accept the at least one drive tube section are positioned with respect to the joint axis, whereby, when a compressive force is exerted on opposing contact surfaces, a force component develops in a whirl chamber depth direction that with two pairs of contact surfaces per force transmission element is at least half of the compressive force exerted by the drive tube section.

24. The adjustment mechanism in accordance with claim 20, wherein said joint comprises as a structural joint.

25. The adjustment mechanism in accordance with claim 24, wherein said structural joint comprises two links that are reciprocally attached to the respective longitudinal stiffening elements of adjacent whirl chambers, the courses of which intersect in the joint axis in the whirl chamber longitudinal direction.

26. The adjustment mechanism in accordance with claim 25, wherein said longitudinal stiffening elements of adjacent whirl chambers are supported on bearing elements that are positioned next to the links relative to the whirl chamber longitudinal direction.

27. The adjustment mechanism in accordance with claim 1, wherein said flow surface is the wing of an aircraft.

28. A process for adjusting for an adjustment area of a variable-shape flow surface with two opposite skin surfaces, the process comprising:
   swivelably positioning a plurality of whirl chambers next to one another so that the whirl chambers are swivelable relative to one another;
   controlling the swiveling of the plurality of whirl chambers by changing a complementary volume of first and second drive tube sections positioned between adjacent longitudinal stiffening elements of the whirl chambers.

* * * * *